United States Patent
Nishio et al.

(10) Patent No.: US 9,451,589 B2
(45) Date of Patent: Sep. 20, 2016

(54) TERMINAL, TRANSMITTING DEVICE, RECEPTION QUALITY REPORTING METHOD AND RECEPTION METHOD

(75) Inventors: Akihiko Nishio, Osaka (JP); Hidetoshi Suzuki, Kanagawa (JP); Masayuki Hoshino, Kanagawa (JP); Hidenori Matsuo, Kanagawa (JP); Takashi Tamura, Kanagawa (JP)

(73) Assignee: PANASONIC INTELLECUTAL PROPERTY CORPORATION OF AMERICA, Torrance, CA (US)

(*) Notice: Subject to any disclaimer, the term of this patent is extended or adjusted under 35 U.S.C. 154(b) by 217 days.

(21) Appl. No.: 14/234,570

(22) PCT Filed: Jun. 1, 2012

(86) PCT No.: PCT/JP2012/003636
§ 371 (c)(1),
(2), (4) Date: Jan. 23, 2014

(87) PCT Pub. No.: WO2013/021531
PCT Pub. Date: Feb. 14, 2013

(65) Prior Publication Data
US 2014/0177601 A1 Jun. 26, 2014

(30) Foreign Application Priority Data

Aug. 5, 2011 (JP) .................................. 2011-171710
Sep. 30, 2011 (JP) .................................. 2011-217298

(51) Int. Cl.
*H04W 72/02* (2009.01)
*H04B 7/02* (2006.01)
(Continued)

(52) U.S. Cl.
CPC ............ *H04W 72/02* (2013.01); *H04B 7/024* (2013.01); *H04L 5/00* (2013.01); *H04W 24/08* (2013.01);
(Continued)

(58) Field of Classification Search
None
See application file for complete search history.

(56) References Cited

U.S. PATENT DOCUMENTS

2008/0146162 A1* 6/2008 Omori ................. H04W 52/282
455/67.13
2010/0272018 A1* 10/2010 Furueda .............. H04W 36/385
370/328
(Continued)

FOREIGN PATENT DOCUMENTS

FI  WO 2012/167425 A1 * 6/2011 ............ H04W 52/14
JP  2011-4212 A  1/2011
(Continued)

OTHER PUBLICATIONS

3GPP TS 36.331 V10.1.0, "Radio Resource Control (RRC) (Release 10)," Mar. 2011.
(Continued)

*Primary Examiner* — Jeffrey M Rutkowski
*Assistant Examiner* — Ning Li
(74) *Attorney, Agent, or Firm* — Pearne & Gordon LLP

(57) ABSTRACT

A terminal which is capable of selecting appropriate transmission points while reducing the overhead for channel state information (CSI) reporting is provided. A measuring unit (303) uses a plurality of reference signals from a plurality of transmission points to measure a first reception quality with respect to each of the plurality of reference signals. A receiving unit (301) receives a first piece of information concerning at least one specific reference signal among the plurality of reference signals, and the measuring unit (303) uses the specific reference signal to measure a second reception quality on the basis of the first piece of information. A transmitting unit (304) reports the first reception quality, which satisfies a predetermined condition, and the second reception quality.

11 Claims, 16 Drawing Sheets

(51) Int. Cl.
  *H04L 5/00* (2006.01)
  *H04W 24/08* (2009.01)
  *H04W 24/10* (2009.01)
  *H04W 72/08* (2009.01)
  *H04W 52/24* (2009.01)
  *H04W 52/14* (2009.01)
  *H04B 7/06* (2006.01)
  *H04W 36/00* (2009.01)

(52) U.S. Cl.
  CPC ............ *H04W 24/10* (2013.01); *H04B 7/0632* (2013.01); *H04B 7/0639* (2013.01); *H04L 5/001* (2013.01); *H04L 5/005* (2013.01); *H04L 5/0035* (2013.01); *H04W 36/0088* (2013.01); *H04W 52/146* (2013.01); *H04W 52/242* (2013.01); *H04W 72/085* (2013.01)

(56) References Cited

U.S. PATENT DOCUMENTS

| | | | | |
|---|---|---|---|---|
| 2010/0322107 | A1* | 12/2010 | Nagano | H04W 36/0083 370/254 |
| 2011/0134774 | A1* | 6/2011 | Pelletier | H04W 52/365 370/252 |
| 2011/0310753 | A1* | 12/2011 | Chou | H04W 48/16 370/252 |
| 2012/0088458 | A1 | 4/2012 | Nogami et al. | |
| 2012/0252460 | A1* | 10/2012 | Koskinen | H04W 36/0088 455/438 |
| 2012/0257515 | A1* | 10/2012 | Hugl | H04W 24/10 370/252 |
| 2012/0281636 | A1* | 11/2012 | Xiao | H04B 7/024 370/329 |
| 2013/0021925 | A1* | 1/2013 | Yin | H04B 7/024 370/252 |
| 2013/0034006 | A1* | 2/2013 | Ishii | H04W 24/10 370/252 |
| 2013/0039199 | A1 | 2/2013 | Liao et al. | |
| 2013/0114562 | A1* | 5/2013 | Seo | H04W 52/146 370/329 |
| 2013/0182583 | A1* | 7/2013 | Siomina | H04W 24/10 370/252 |

FOREIGN PATENT DOCUMENTS

| | | | | |
|---|---|---|---|---|
| JP | WO 2011/099634 | * | 8/2011 | ............ H04W 36/38 |
| WO | 2013/020520 A1 | | 2/2013 | |

OTHER PUBLICATIONS

3GPP TS 36.211. V10.1.0, "Physical Channels and Modulation (Release 10)," Mar. 2011.
3GPP TS 36.212 V10.1.0, "Multiplexing and channel coding (Release 10)," Mar. 2011.
3GPP TS 36.213 V10.1.0, "Physical layer procedures (Release 10)," Mar. 2011.
"Aspects on Distributed RRUs with Shared cell-ID for Heterogeneous Deployments", 3GPP TSG RAN WG1 meeting #64, R1-110649, Feb. 2011.
Zte, "Views on Rel-11 CoMP", 3GPP TSG RAN WG1 Meeting #63bis, R1-110573, Jan. 2011, pp. 1-2.
Samsung, "Discussions on CSI-RS port selection for non-uniform networks with low-power nodes", 3GPP TSG-RAN1 #65 meeting, R1-111469, May 2011, pp. 1-3.
Panasonic, "CoMP feedback overhead reduction based on precoded RS", 3GPP TSG RAN WG1 Meeting #58b, R1-093949, Oct. 2009, pp. 1-3.
Panasonic, "Flexible CoMP Operation based on Dedicated CSI-RS Configuration", 3GPP TSG RAN WG1 Meeting #65, R1-111587, May 2011, pp. 1-5.
Marvell, "High level views for CoMP Feedback for Release 11", 3GPP TSG RAN WG1 #63bis, R1-110268, Jan. 2011, pp. 1-2.
International Search Report for Application No. PCT/JP2012/003636 dated Jul. 31, 2012.
Extended European Search Report for Application No. 12822889.7 dated Mar. 24, 2015.
Hitachi Ltd., "Further Considerations on Scenario3", 3GPP TSG-RAN WG1 #66b, R1-113064, Oct. 10-14, 2011.

* cited by examiner

| CSI-RS configuration (resourceConfig) | Mapping pattern |
|---|---|
| 0 | Pattern 0 |
| 1 | Pattern 1 |
| 2 | Pattern 2 |
| 3 | Pattern 3 |
| 4 | Pattern 4 |
| ... | ... |

FIG. 9

TERMINAL, TRANSMITTING DEVICE, RECEPTION QUALITY REPORTING METHOD AND RECEPTION METHOD

TECHNICAL FIELD

The present invention relates to a terminal, a transmitting apparatus, a reception quality reporting method and a reception method.

BACKGROUND ART

In Release 8 (hereinafter, referred to Rel. 8) of the 3rd Generation Partnership Project Radio Access Network Long Term Evolution (3GPP-LTE, hereinafter, referred to as "LTE"), orthogonal frequency division multiple access (OFDMA) is employed as a downlink communication scheme, and single carrier frequency division multiple access (SC-FDMA) is employed as an uplink communication scheme.

In the downlink of Rel. 8, a cell specific reference signal (hereinafter, referred to as CRS) is used as a reference signal for demodulation of a data signal (PDSCH). The CRS is a reference signal commonly used within a cell. The CRS is transmitted in a time/frequency resource depending on a cell ID and is transmitted to cover the entire area of the cell. Further, the CRS is transmitted in all subframes. Further, the CRS is also used for measurement for link adoption and mobility management such as cell selection. That is, a terminal (called user equipment (UE)) measures reception power (reference signal reception power (RSRP)) or reception quality (reference signal reception quality (RSRQ)) using a CRS of a cell (serving cell) to which the UE is connected and a CRS of an adjacent cell. Further, when a predetermined reference is satisfied, for example, when the RSRP of the adjacent cell is higher than the RSRP of the serving cell by 3 [dB], the terminal reports the cell ID and the RSRP of the adjacent cell. In this case, when information relating to the cell ID of the adjacent cell is broadcasted, the terminal may perform cell detection using the cell ID (for example, see NPL 1).

In contrast, LTE-Advanced (hereinafter, referred to as "LTE-A" or "Release 10 (Rel. 10)," which is an advanced version of LTE (Rel. 8) supports data transmission using a demodulation reference signal called "DMRS" or "UE specific Reference Signal" as an extension of multiple input multiple output (MIMO) transmission in the downlink. While the CRS is transmitted to the entire cell, the DMRS is transmitted to a terminal for which data is assigned, so that the DMRS enables beam formation by precoding, and data transmission of high throughput (for example, see NPL 2, NPL 3 and NPL 4). In Rel. 10, the transmission using the DMRS can be used for a terminal in which transmission mode 9 is set.

Further, channel state information (CSI) used for link adoption or scheduling is measured using a CSI-RS. The CSI-RS is transmitted in different resources (time, frequency or code) from respective antennas (antenna ports). For example, the CSI-RS is normally transmitted at an interval of about 10 sub frames (10 ms). Further, resource information on the CSI-RS that is to be a CSI measurement and reporting target in a terminal is indicated to the terminal (UE) from a base station (or referred to as "eNB"). The CSI includes a channel quality indicator (CQI) indicating reception quality (SINR) or achievable data rate, and a precoding matrix indicator (PMI) indicating an optimal precoding matrix.

Further, in Release 11 (hereinafter, referred to as Rel. 11), which is the next release of Rel. 10, studies have been carried out on coordinated multi point transmission and reception (CoMP) in a heterogeneous network that uses a plurality of base stations having coverage areas different in size. The heterogeneous network is a network that includes a macro base station (high power node (HPN)) and a pico base station (low power node (LPN)) or a remote radio head (RRH). In the CoMP network, a plurality of nodes (transmission points (TP)) perform data transmission and reception with a terminal in a coordinated manner. Here, in the system of the related art, each transmission point forms a cell having a different cell ID. Accordingly, a CRS transmitted in a time/frequency resource arrangement depending on the cell ID is transmitted in a different arrangement for each cell. For this reason, data (PDSCH) is also transmitted in a different resource arrangement, so that coordinated transmission from the plurality of transmission points is performed in a restricted manner.

In this respect, in Rel. 11, a CoMP operation using the same cell ID has been discussed (for example, see NPL 5). The CoMP operation using the same cell ID refers to an operation in which the same cell ID as the cell ID of an HPN (macro base station, Macro eNB) is assigned to a plurality of LPNs (pico base stations) in a macro cell (cell covered by the HPN) (for example, see FIG. 1). In such an operation, since the cell IDs of the HPN and the LPN (hereinafter, referred to as transmission points) in the same macro cell ID are the same, CRSs transmitted in a resource depending on the cell ID are transmitted in the same resource at the plurality of transmission points. Accordingly, the CRSs transmitted from the respective transmission points are combined in a manner for signals transmitted in single frequency network for reception in a terminal. Further, a data channel (PDSCH) and a control channel (PDCCH) for each terminal to be demodulated using the CRS are transmitted in the same time/frequency resource from all the transmission points in order to maintain the same phase relationship with the CRS. Thus, in Rel. 11, a method for transmitting a PDSCH for a different terminal using the same time/frequency resource from different transmission points using a UE specific reference signal (for example, DMRS) has been discussed.

CITATION LIST

Non-Patent Literature

NPL 1
3GPP TS 36.331 V10.1.0, "Radio Resource Control (RRC) (Release 10)," March 2011
NPL 2
3GPP TS 36.211. V10.1.0, "Physical Channels and Modulation (Release 10)," March 2011
NPL 3
3GPP TS 36.212 V10.1.0, "Multiplexing and channel coding (Release 10)," March 2011
NPL 4
3GPP TS 36.213 V10.1.0, "Physical layer procedures (Release 10)," March 2011
NPL 5
3GPP TSG RAN WG1 meeting, R1-110649, February 2011

SUMMARY OF INVENTION

Technical Problem

In the CoMP operation using the same cell ID, performing data transmission for each terminal from only a transmission point positioned in the vicinity of each terminal makes it possible to reuse the same time/frequency resource as a resource for a different user at a distant transmission point. Thus, it is possible to achieve a system operation with high efficiency and high throughput.

However, according to the system in the related art, in order to select an appropriate transmission point for each terminal, it is necessary to transmit different CSI-RSs (CSI-RSs mapped to different resources between respective transmission points) from respective transmission points (for example, see FIG. 2). That is, it is necessary to indicate to a terminal all CSI-RS resources used in an area having the same cell ID as the CSI-RSs that are CSI measurement and reporting targets, and to cause the terminal to perform CSI measurement and reporting. Thus, a base station can determine an appropriate transmission point on the basis of CSI measurement results for the CSI-RSs at all the transmission points reported from the terminal.

However, it is necessary that CSI be reported at relatively short intervals in order to be used for link adoption of data transmission and to follow momentary fading fluctuation. Further, since the terminal reports information including PMI with good quality and CQI per frequency (sub-band) as the CSI, the data amount of a CSI measurement result is relatively large. If the terminal reports the CSI measurement results for the CSI-RSs at all the transmission points, the amount of information on the CSI measurement results is increased significantly, which raises a concern for degradation of uplink data throughput. Further, the amount of calculation for CSI measurement (calculation of CQI and PMI) increases in the terminal, and complexity of the terminal increases.

An object of the invention is to provide a terminal, a transmitting apparatus, a reception quality reporting method and a reception method capable of selecting an appropriate transmission point while reducing overhead for CSI reporting.

Solution to Problem

A terminal according to a first aspect of the present invention is a terminal including: a first measuring section that measures, using a plurality of reference signals from a plurality of transmission points, a first reception quality for each of the plurality of reference signals; a receiving section that receives first information relating to at least one specific reference signal among the plurality of reference signals; a second measuring section that measures a second reception quality using the specific reference signal based on the first information; and a transmitting section that reports the first reception quality and the second reception quality which satisfy a predetermined condition.

A transmitting apparatus according to an aspect of the present invention is a transmitting apparatus including: a transmitting section that transmits a reference signal to a terminal; a receiving section that receives a first reception quality for each of a plurality of reference signals, the first reception quality being measured in the terminal using a corresponding one of the plurality of reference signals, and satisfying a predetermined condition; and a determining section that determines at least one specific reference that is a measurement target of a second reception quality from among the plurality of reference signals, in which the receiving section receives the second reception quality measured in the terminal using the specific reference signal.

A reception quality reporting method according to an aspect of the present invention is a method including: measuring, using a plurality of reference signals from a plurality of transmission points, a first reception quality for each of the plurality of reference signals; receiving first information relating to at least one specific reference signal among the plurality of reference signals; measuring a second reception quality using the specific reference signal based on the first information; and reporting the first reception quality and the second reception quality that satisfy a predetermined condition.

A reception method according to an aspect of the present invention is a method including: transmitting a reference signal to a terminal; receiving a first reception quality for each of a plurality of reference signals, the first reception quality being measured in the terminal using a corresponding one of the plurality of reference signals from a plurality of transmission points, and satisfying a predetermined condition; determining at least one specific reference signal that is a measurement target of a second reception quality from among the plurality of reference signals; and receiving the second reception quality measured in the terminal using the specific reference signal.

Advantageous Effects of Invention

According to the invention, it is possible to select an appropriate transmission point while reducing overhead for CSI reporting.

BRIEF DESCRIPTION OF DRAWINGS

FIG. 9 is a diagram illustrating an example of a correspondence between a CSI-RS configuration and a mapping pattern according to Embodiment 1 of the invention;

DESCRIPTION OF EMBODIMENTS

Figure 1:
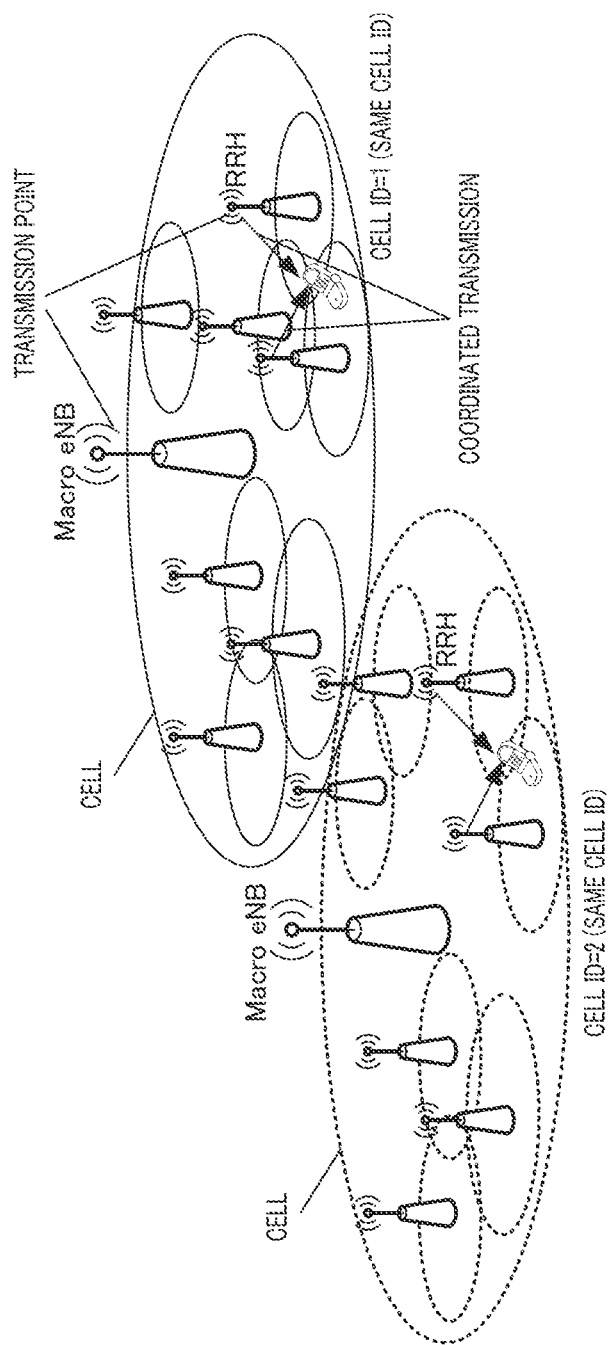
FIG. 1 is a diagram illustrating a CoMP operation using the same cell ID in each macro cell.
Figure 2:
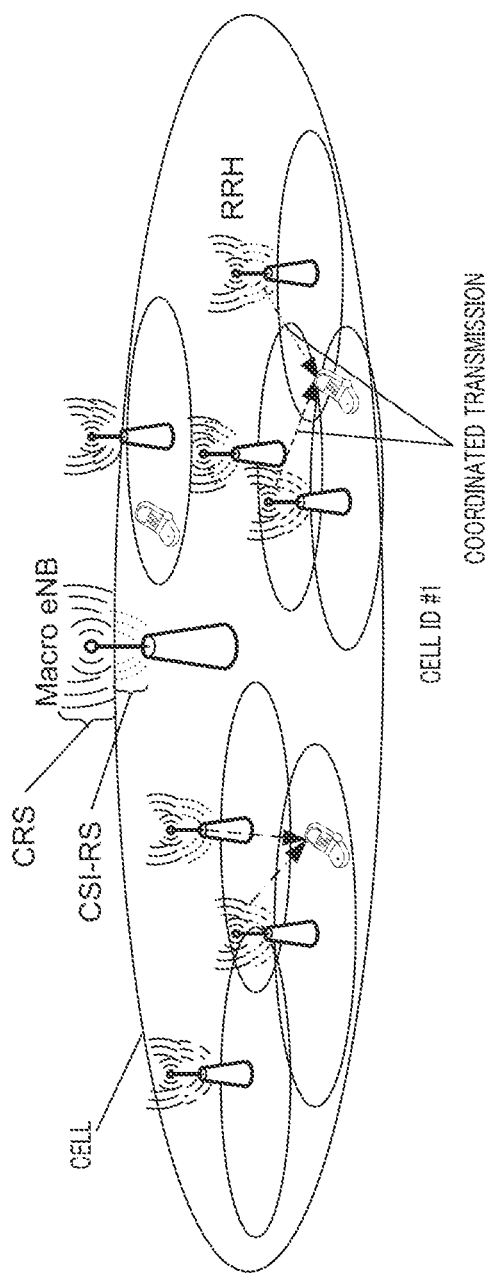
FIG. 2 is a diagram illustrating a CoMP operation using a different CRS-RS resource at each transmission point.

Hereinafter, embodiments of the invention will be described in detail with reference to the accompanying drawings. In the embodiments, the same reference numerals are given to the same components, and repetitive description thereof is omitted.

[Embodiment 1]
[Overview of Communication System]

A communication system according to the present embodiment includes macro base station (HPN, Macro eNB) 100, pico base station (LPN, RRH) 200, and terminal 300. For example, macro base station 100 corresponds to a transmitting apparatus according to the present embodiment. Macro base station 100 and a plurality of pico base stations 200 that are deployed in a coverage area of macro base station 100 transmit a signal to terminal 300 in a coordinated manner.

Macro base station 100 and one or a plurality of pico base stations 200 are connected to each other through an interface with low delay and high capacity, such as an optical fiber.

Further, in a cell (macro cell) covered by macro base station 100, the same cell ID is set in macro base station 100 and pico base station 200. That is, the same cell ID is set for transmission points in the macro cell covered by macro base station 100. Accordingly, macro base station 100 and pico base station 200 transmit a CRS in the same resource (time, frequency or code) depending on the cell ID.

On the other hand, each transmission point in the macro cell covered by macro base station 100 transmits a CSI-RS of a different configuration (setting of a resource, an antenna port and the like).

Further, in the following description, each transmission point has one or a plurality of antenna ports.

Further, in the following description, terminal 300 measures two types of reception qualities using a CSI-RS. For example, one reception quality (first reception quality) corresponds to reception power, RSRP, RSRQ, SINR, SLNR (Signal to Leakage plus Noise Ratio) or the like. The other reception quality (second reception power) corresponds to CSI (CQI and PMI). Here, a processing burden necessary for measurement of the first reception quality is smaller than a processing burden necessary for measurement of the second reception quality. Further, the amount of information necessary for reporting the first reception quality is smaller than the amount of information necessary for reporting the second reception quality.

Figure 3:
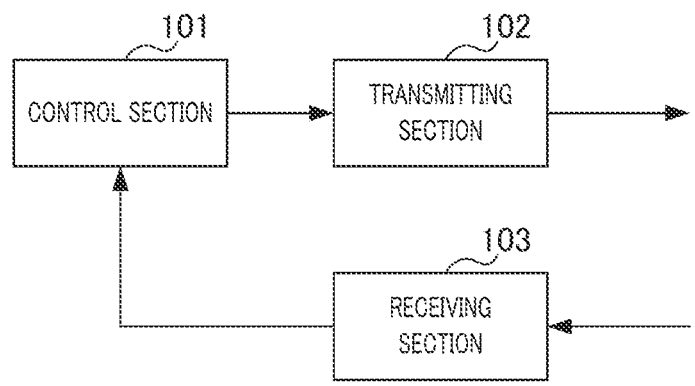
FIG. 3 is a diagram illustrating a main configuration of a macro base station according to Embodiment 1 of the invention.

FIG. 3 is a diagram illustrating a main configuration of macro base station 100 according to the present embodiment. In macro base station 100, transmitting section 102 transmits a plurality of reference signals (CSI-RS) to terminal 300, receiving section 103 receives the first reception quality (reception power) for each of the plurality of reference signals, which is measured using a corresponding one of the plurality of reference signals in terminal 300 and which satisfies a predetermined condition, and control section 101 determines at least one specific reference signal that is a measurement target of the second reception quality (CSI) from among the plurality of reference signals. Further, receiving section 103 receives the second reception quality measured using the specific reference signal in terminal 300.

Figure 4:
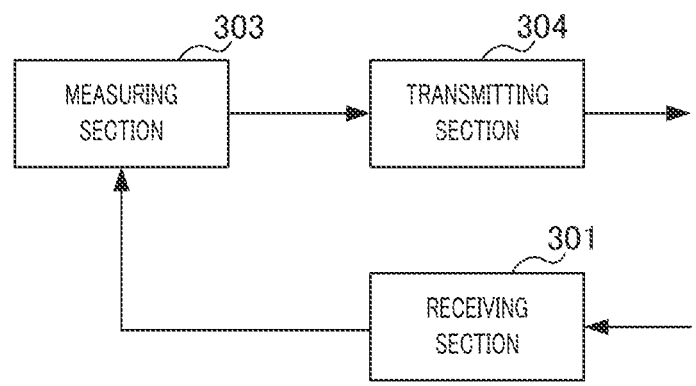
FIG. 4 is a diagram illustrating a main configuration of a terminal according to Embodiment 1 of the invention.

FIG. 4 is a diagram illustrating a main configuration of terminal 300 according to the present embodiment. In terminal 300, measuring section 303 measures the first reception quality (reception power) for each of the plurality of reference signals using a corresponding one of the plurality of reference signals (CSI-RS) from a plurality of transmission points, receiving section 301 receives first information (measurement list) relating to at least one specific reference signal among the plurality of reference signals, measuring section 303 measures the second reception quality (CSI) using the specific reference signal based on the first information, and transmitting section 304 reports the first reception quality and the second reception quality that satisfy the predetermined condition.

[Configuration of Macro Base Station 100]

Figure 5:
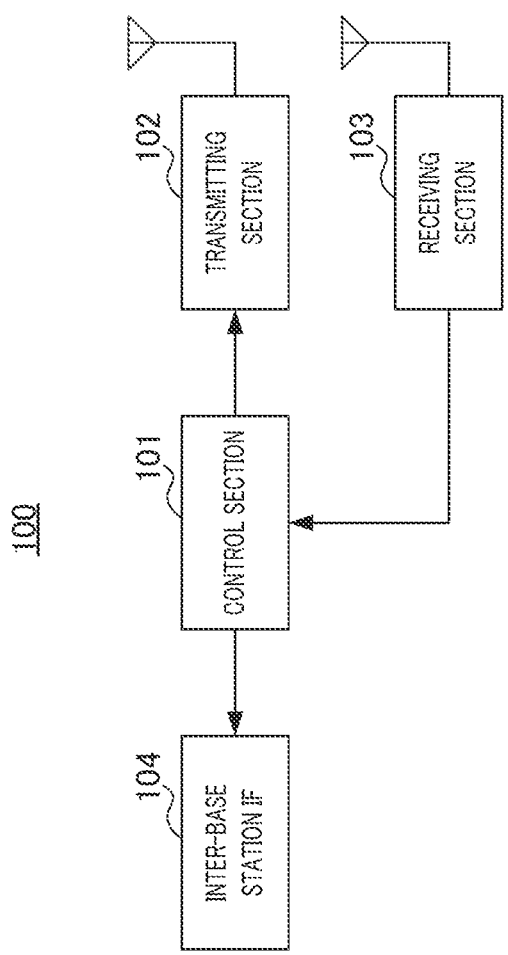
FIG. 5 is a block diagram illustrating a configuration of a macro base station according to Embodiment 1 of the invention.

FIG. 5 is a block diagram illustrating a configuration of macro base station 100 according to the present embodiment.

In macro base station 100 shown in FIG. 5, control section 101 controls the CSI-RS (that is, transmission point) that is a CSI measurement and reporting target in each terminal 300, and controls pico base station 200 (RRH).

Specifically, control section 101 creates a list indicating a configuration (configuration information) of the CSI-RS used at each of the transmission points (macro base station 100 (HPN) and pico base station 200 (LPN)) in the macro cell covered by macro base station 100 as a "CSI-RS candidate list (CCL)." That is, the "CSI-RS candidate list" indicates a plurality of CSI-RSs. When the position of terminal 300 is detectable from an uplink received signal power or the like, control section 101 may include only the configuration of the CSI-RS at a transmission point (HPN/LPN) located in the vicinity of terminal 300 in the CSI-RS candidate list.

Further, control section 101 sets a predetermined condition (hereinafter, referred to as a reporting condition) that is a reference for whether or not to report a reception power (RSRP) measured using the CSI-RS by terminal 300. Examples of the "reporting condition" include a condition that the reception power (RSRP) is equal to or greater than a predetermined threshold. That is, when the reporting condition is satisfied, terminal 300 reports a result of reception power measurement.

Further, control section 101 determines the configuration (that is, transmission point) of the CSI-RS that is the CSI measurement and reporting target using information (identifier of the CSI-RS resource that satisfies the reporting condition, and the result of reception power measurement) relating to the CSI-RS included in a signal (received signal) to be received from terminal 300 through receiving section 103 or inter-base station IF 104. That is, control section 101 determines at least one specific CSI-RS that is a CSI measurement target from among a plurality of CSI-RSs. Control section 101 generates the configuration of the determined CSI-RS (at least one specific CSI-RS) as a "CSI-RS measurement list (CML)." That is, the "CSI-RS measurement list" is determined using information indicating the specific CSI-RS, which is information relating to at least one CSI-RS corresponding to the reception power that satisfies the reporting condition among the plurality of CSI-RSs shown in the CSI-RS candidate list. Here, the CSI-RS measurement list may include information about the time/frequency resource of the CSI-RS or the like, or may use an identifier of the CSI-RS resource given in the CSI-RS candidate list (that is, information indicating the order of the CSI-RS configuration in the CSI-RS candidate list). When the identifier of the latter CSI-RS resource is used, it is possible to reduce the amount of information indicating the CSI-RS measurement list.

Further, control section 101 determines transmission parameters with respect to transmission points used for transmission of a DMRS and data (PDSCH) using the CSI measurement result (CQI and PMI) included in the signal (received signal) to be received from terminal 300 through receiving section 103 or inter-base station IF 104. That is, control section 101 performs scheduling of a PDSCH on the basis of the CSI measurement result. Examples of the transmission parameters with respect to the transmission points include a frequency resource, and a precoding matrix, transmission power. The transmission parameters are output to transmitting section 102 and inter-base station IF (interface) 104.

Further, control section 101 sets a configuration of transmission parameters (cell ID, antenna port, time/frequency resource and the like) used for transmission of the CSI-RS, CRS, DMRS, PDCCH or the like. In the cell (macro cell) of macro base station 100, the same cell ID is used between the transmission points, and a resource of the CRS (CRS resource) depending on the cell ID is a common resource between the transmission points. On the other hand, the CSI-RS has a different configuration for each transmission point. This configuration is output to transmitting section 102 and inter-base station IF (interface) 104.

As described above, the "CSI-RS candidate list" and the "reporting condition" generated in control section 101 are transmitted to each terminal 300 through transmitting section 102. These information items may be transmitted as broadcast information, or may be indicated as RRC control information of each terminal. Alternatively, the CSI-RS candidate list may be included in a MAC header. Further, the "CSI-RS measurement list" is transmitted to each terminal 300 through transmitting section 102. This information may be transmitted as control information of each terminal, may be indicated as RRC control information, or may be included in the MAC header or PDCCH.

Transmitting section 102 performs a transmission process for the information (including "CSI-RS candidate list," "reporting condition," and "CSI-RS measurement list") input from control section 101, and transmits a signal subjected to the transmission process through an antenna. Further, transmitting section 102 transmits the CSI-RS, CRS, DMRS and the data signal (PDSCH) and control signal (PDCCH) to terminal 300 according to the transmission parameters (configuration) input from control section 101.

Receiving section 103 performs a reception process for the signal received through the antenna and outputs the obtained received signal to control section 101. The received signal includes the data signal from terminal 300, information relating to the CSI-RS (information on the CSI-RS that satisfies the "reporting condition"), the CSI measurement result (CQI and PMI) or the like.

Inter-base station IF 104 performs communication with pico base station 200. For example, inter-base station IF 104 performs forwarding of the transmission parameters and transmission data used for transmission to terminal 300 from pico base station 200, reception of reception data (including information on the CSI-RS that satisfies the reporting condition and the CSI measurement result) from terminal 300 received by pico base station 200, and the like.

[Configuration of Pico Base Station 200]

Figure 6:
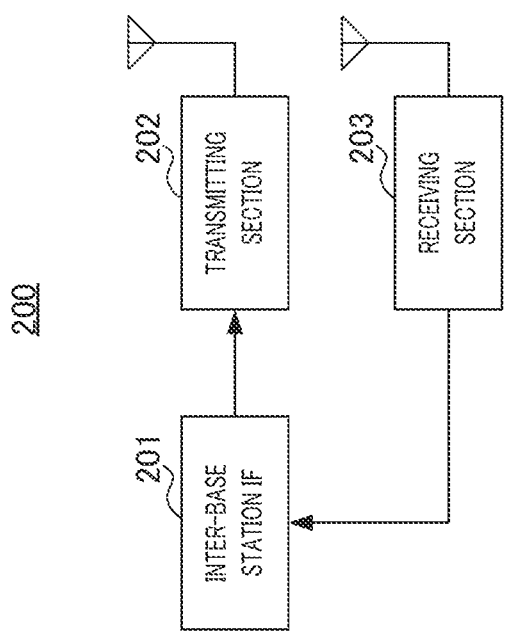
FIG. 6 is a block diagram illustrating a configuration of a pico base station according to Embodiment 1 of the invention.

FIG. 6 is a block diagram illustrating a configuration of pico base station 200 according to the present embodiment.

In pico base station 200 shown in FIG. 6, inter-base station IF 201 performs communication with macro base station 100 (FIG. 5). For example, inter-base station IF 201 receives the transmission parameters and transmission data used for transmission to terminal 300 from macro base station 100, and outputs the received transmission parameters and transmission data to transmitting section 202. Further, inter-base station IF 201 forwards reception data (including the information relating to the CSI-RS measurement result (information on the CSI-RS that satisfies the reporting condition) and the CSI measurement result (CQI and PMI)) from terminal 300, input from receiving section 203, to macro base station 100.

Transmitting section 202 transmits the transmission data for terminal 300 through the antenna according to the transmission parameters input from inter-base station IF 201.

Receiving section 203 receives a signal from terminal 300 through the antenna. The signal from terminal 300 includes user data, the information relating to the CSI-RS measurement result (information on the CSI-RS that satisfies a predetermined condition), the CSI measurement result (CQI and PMI) and the like.

[Configuration of Terminal 300]

Figure 7:
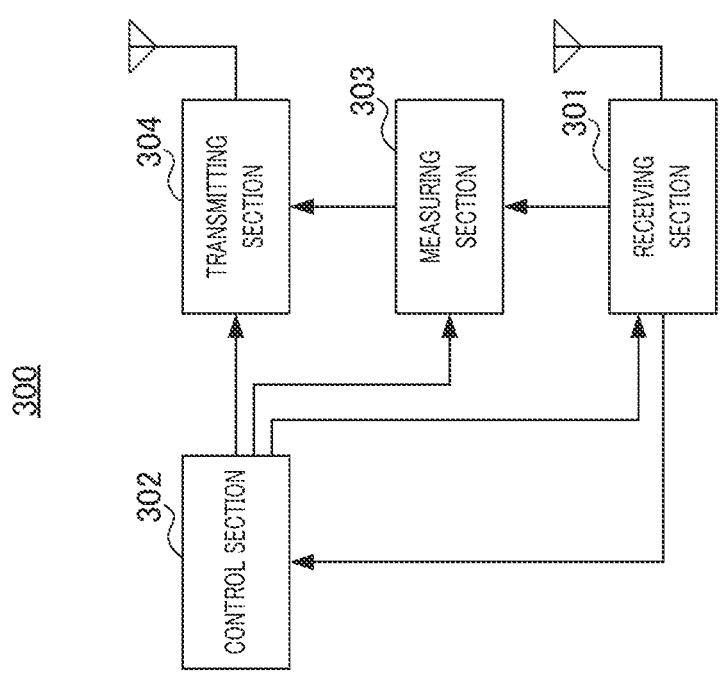
FIG. 7 is a block diagram illustrating a configuration of a terminal according to Embodiment 1 of the invention.

FIG. 7 is a block diagram illustrating a configuration of terminal 300 according to the present embodiment. Terminal 300 performs communication with macro base station 100 (FIG. 5) or pico base station 200 (FIG. 6).

In terminal 300 shown in FIG. 7, receiving section 301 performs a reception process for a signal received through the antenna, to obtain a received signal. The received signal includes the CRS, CSI-RS, DMRS, data signal (PDSCH), control signal (PDCCH) and the like transmitted from macro base station 100 (HPN) or pico base station 200 (LPN). Further, the received signal includes the "CSI-RS candidate list," the "reporting condition" or the "CSI-RS measurement list" transmitted from macro base station 100.

Receiving section 301 extracts the data signal (PDSCH) or the CSI-RS in a resource specified by control section 302. Receiving section 301 outputs the CSI-RS to measuring section 303. Further, receiving section 301 extracts the "CSI-RS candidate list," the "reporting condition" and the "CSI-RS measurement list" from the received signal, and outputs the extracted information to control section 302.

Control section 302 specifies to receiving section 301 resource information on the CSI-RS (information indicating in which resource (time, frequency or code) the CSI-RS is included), on the basis of the "CSI-RS candidate list" or the "CSI-RS measurement list" input from receiving section 301. Further, control section 302 specifies to receiving section 301 resource information on a downlink data signal (PDSCH) (information indicating in which resource the user data is to be received), on the basis of the control information (PDSCH), for example. Further, control section 302 specifies to transmitting section 304 resource information on an uplink data signal (PUSCH) (information indicating in which resource the user data is to be transmitted), on the basis of the control information (PDCCH), for example.

Further, control section 302 outputs the "reporting condition (condition that is a reference for whether or not to report the result of reception power measurement based on the CSI-RS candidate list)" input from receiving section 301, to measuring section 303.

Measuring section 303 performs measurement of reception power (for example, RSRP) based on the CSI-RS candidate list using the CSI-RS input from receiving section 301. That is, measuring section 303 measures the reception power for each of the plurality of CSI-RSs using the plurality of CSI-RSs (a plurality of CSI-RSs indicated in the CSI-RS candidate list) from the plurality of transmission points. The measurement result of the reception power is used for selection of the transmission point. Measuring section 303 measures averaged reception power over a relatively long time (for example, several hundreds of ms). In other words, measuring section 303 periodically measures the reception power with a relatively low frequency.

Further, measuring section 303 determines whether the measured reception power satisfies the "reporting condition (for example, a condition that the reception power is equal to or higher than a predetermined threshold)". When the measured reception power satisfies the reporting condition, measuring section 303 outputs the CSI-RS (identifier of the resource of the CSI-RS) corresponding to the reception power and the information relating to the CSI-RS including information indicating the reception power, to transmitting section 304. Thus, information relating to at least one CSI-RS corresponding to the reception power that satisfies the reporting condition among the plurality of CSI-RSs shown in the CSI-RS candidate list is transmitted to base station 100. The information relating to the CSI-RS includes the identifier indicating the CSI-RS corresponding to the reception power that satisfies the reporting condition, the result of reception power measurement that satisfies the reporting condition, and the like, for example.

Further, measuring section 303 measures the CSI (CQI and PMI) based on the CSI-RS measurement list using the CSI-RS input from receiving section 301. That is, measuring section 303 measures the CSI using a specific CSI-RS indicated by the CSI-RS measurement list. The CSI is used for scheduling in actual data transmission, link adoption (MCS control) and precoding control. Measuring section 303 measures an averaged CSI over a relatively short time (or CSI per subframe). In other words, measuring section 303 periodically measures the CSI relatively frequently. The CSI is configured by a PMI indicating a precoding matrix capable of realizing the maximum throughput and a CQI indicating a data rate at which transmission is possible at a predetermined error rate or an MCS.

That is, measuring section 303 measures first reception quality (reception power or the like) of a plurality of transmission points on the basis of the CSI-RS candidate list using the CSI-RS, and measures a second reception quality (CSI) at a specific transmission point on the basis of the CSI-RS candidate list. As described above, the measurement result (information relating to the CSI-RS) of the reception power measured in measuring section 303 or the CSI measurement result is output to transmitting section 304.

Transmitting section 304 performs a transmission process for a transmission signal that includes the user data (PUSCH), the information relating to the CSI-RS (information on the CSI-RS that satisfies the predetermined condition) or the CSI measurement result (CQI and PMI), and transmits the signal subjected to the transmission process through the antenna. Transmitting section 304 transmits the user data according to an instruction from control section 302. In this way, the information relating to the CSI-RS (information on the CSI-RS that satisfies the predetermined condition) or the CSI measurement result (CQI and PMI) are reported to macro base station 100 directly or through pico base station 200 to which terminal 300 is connected.

[Operation of Macro Base Station 100 and Terminal 300]

Operations of macro base station 100 and terminal 300 having the above-described configuration will be described.

Figure 8:
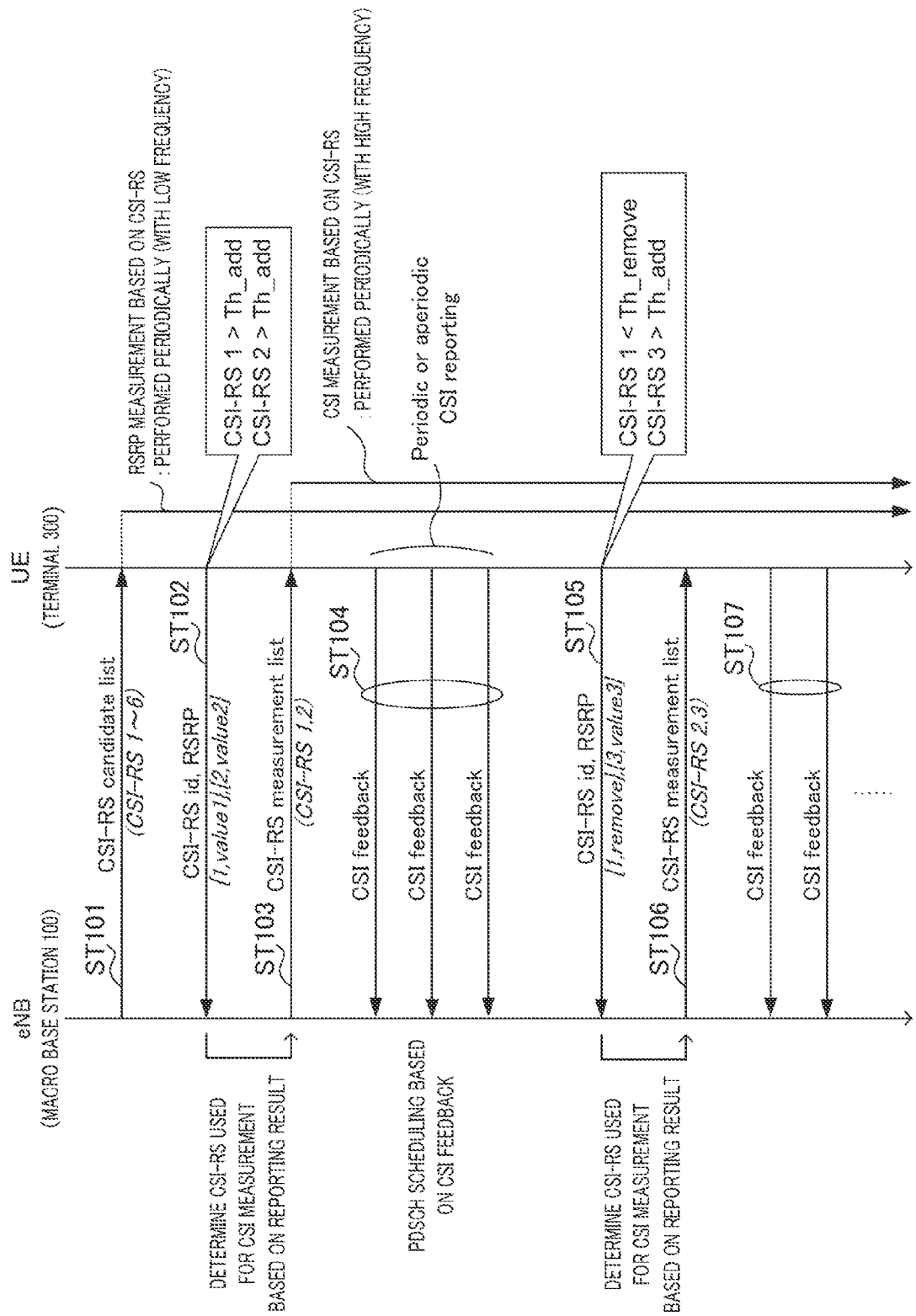
FIG. 8 is a diagram illustrating processes of a macro base station and a terminal according to Embodiment 1 of the invention.

FIG. 8 is a flowchart illustrating the flow of processes of macro base station 100 (indicated as eNB) and terminal 300 (indicated as UE).

In FIG. 8, in step (hereinafter, referred to as "ST") 101, macro base station 100 indicates the CSI-RS candidate list (CCL) set in control section 101 to terminal 300. The CSI-RS candidate list includes configurations corresponding to the transmission points (that is, corresponding to CSI-RS candidates) in the cell (macro cell) of macro base station 100. As an identifier of each CSI-RS candidate, for example, a CSI-RS candidate number (or CSI-RS configuration ID) is given. For example, in FIG. 8, CSI-RS candidate numbers 1 to 6 (CSI-RS 1 to CSI-RS 6) are included in the CSI-RS candidate list.

Further, the configurations each relating to the CSI-RS (CSI-RS configuration) include (1) the number of antenna ports (Antenna Ports Count), (2) a time/frequency resource position in a subframe (resourceConfig), (3) a transmission period and a time offset of the CSI-RS (subframeConfig), (4) an offset for a measurement result for preferential selection (CSI-RS individual offset), and the like.

That is, the CSI-RS candidate list includes CSI-RS configurations each of which includes information about (1) to (4) described above and which correspond to the transmission points (corresponding to the CSI-RS candidates).

For example, as shown in FIG. 9, the CSI-RS configuration (RRC parameter name: resourceConfig) and mapping pattern in a time-frequency domain are associated with each other. In this case, the "resourceConfig" is specified by indicating a CSI-RS configuration ID, as shown in FIG. 9. For example, the mapping patterns (Pattern 0 to Pattern 4) shown in FIG. 9 correspond to mapping (Pattern 0 to Pattern 4) of physical resources shown in FIG. 10.

Further, the "subframeConfig" is defined by a combination of the predetermined period and the time offset (subframe offset), for example. For example, if the period is 10 ms (10 subframes) and the time offset is 0 (0 subframe), the period of 10 ms from subframe #0 is set in the CSI-RS.

Further, the "CSI-RS individual offset" is an offset given to the measurement result of each CSI-RS candidate. Thus, for example, in CSI-RSs of crowded transmission points, reducing the offset makes it possible to perform a control for making selection of the transmission points difficult, for example. The same "CSI-RS individual offset" as in the mobility measurement may be used.

Further, macro base station 100 indicates to terminal 300 a reception power measurement method and a "reporting condition (Event)" of the measurement result (not shown). The reception power measurement method may employ RSRP, RSRQ, reception SIR (Signal to Interference Ratio), reception SLNR (Signal to Leakage plus Noise Ratio: ratio of desired signal power and interference power (+noise power) to a terminal in a different cell), or the like.

Further, examples of the "reporting condition (Event)" include a case where the measurement result is higher than a predetermined threshold A, a case where the measurement result is lower than a predetermined threshold B, a case where the measurement result is higher than a measurement result of the CSI-RS currently designated as a CSI measurement target (that is, CSI-RS measurement list) by a predetermined threshold C [dB], or the like. Terminal 300 transmits a first reception quality to base station 100 when the reception power using the CSI-RS based on the CCL is higher than a threshold. Thus, base station 100 can recognize transmission points to be considered as CSI-RS candidates (second information: CML) for measurement of a second reception quality in terminal 300 at an appropriate timing. Further, terminal 300 transmits the first reception quality to base station 100 when the reception power using the CSI-RS based on the CCL is lower than a threshold. Thus, base station 100 can recognize transmission points that may not be considered as the CSI-RS candidates (second information: CML) for measurement of the second reception quality in terminal 300 at an appropriate timing. As a result, base station 100 can update the CSI-RS candidates suitable for terminal 300 at the appropriate timing, to thereby appropriately perform scheduling. Consequently, it is possible to improve the throughput of terminal 300, and to effectively use the frequency resources. Further, when a reception quality at a different transmission point is higher than the reception quality at the transmission point considered as a candidate for use, terminal 300 transmits the first reception quality, so that base station 100 can more accurately determine the CSI-RS candidates for measurement of the second reception quality. FIG. 8 is a diagram illustrating an example in which RSRP is used as the measurement method and a case where the reception power is higher than a threshold Th_add and is lower than a threshold Th_remove is used as the reporting condition.

Measuring section 303 of terminal 300 performs the RSRP measurement using the CSI-RS on the basis of the CSI-RS candidate list indicated in ST101 and the measurement method of the reception power indicated from macro base station 100. That is, in FIG. 8, measuring section 303 measures RSRPs for six types of CSI-RSs (that is, six transmission points) on the basis of the CSI-RS configurations of CSI-RS 1 to CSI-RS 6 indicated in the CSI-RS candidate list. Further, measuring section 303 determines whether the measured RSRPs satisfy the reporting condition. In FIG. 8, the RSRPs of CSI-RS 1 and CSI-RS 2 in the CSI-RS candidate list (CSI-RS 1 to CSI-RS 6) are higher than the threshold Th_add.

In ST102, terminal 300 reports (transmits) to macro base station 100 information relating to at least one CSI-RS candidate (that is, transmission point) corresponding to the RSRP that satisfies the reporting condition among the plurality of CSI-RS candidates indicated in the CSI-RS candidate list. Specifically, terminal 300 reports to macro base station 100 CSI-RS candidate numbers (CSI-RS 1 and CSI-RS 2 in FIG. 8) that satisfy the reporting condition and the measurement results (value 1 and value 2 in FIG. 8) of the CSI-RSs that satisfy the reporting condition. That is, macro base station 100 receives the reception power measurement result, for each of the plurality of CSI-RSs, which is measured using the plurality of CSI-RSs in terminal 300 and satisfies the reporting condition. Terminal 300 may report only the CSI-RS candidate numbers in reporting of the RSRP (reception power).

Control section 101 of macro base station 100 determines at least one CSI-RS (specific CSI-RS that is a measurement target of the CSI) used for CSI measurement, among the plurality of CSI-RS candidates indicated in the CSI-RS candidate list, on the basis of the information (CSI-RS candidate numbers and RSRP measurement results) received from terminal 300 in ST102. In FIG. 8, control section 101 determines that a terminal is present in the vicinity of transmission points that use CSI-RS 1 and CSI-RS 2. Alternatively, in FIG. 8, control section 101 determines that a reception quality from the transmission points that use CSI-RS 1 and CSI-RS 2 in terminal 300 is higher than that from a different transmission point. Thus, control section 101 determines CSI-RS 1 and CSI-RS 2 as CSI-RSs that are CSI measurement and reporting targets. In other words, control section 101 determines the transmission point that uses CSI-RS 1 and the transmission point that uses CSI-RS 2 as the transmission points that are the CSI measurement and reporting targets.

Alternatively, control section 101 may determine any one of CSI-RS 1 and CSI-RS 2 as the specific CSI-RS that is the CSI-RS measurement target. In this case, control section 101 may determine one having a higher RSRP value (one of value 1 and value 2), among CSI-RS 1 and CSI-RS 2, as the CSI-RS that is the CSI measurement and reporting target.

In ST103, macro base station 100 generates a CSI-RS measurement list (CML) that includes CSI-RS 1 and CSI-RS 2 determined as the CSI measurement and reporting targets and indicates the CSI-RS measurement list to terminal 300.

Upon reception of the CSI-RS measurement list in ST103, measuring section 303 of terminal 300 measures the CSI (CQI and PMI) using the specific CSI-RSs (CSI-RS 1 and CSI-RS 2) indicated in the CSI-RS measurement list. That is, measuring section 303 measures the CSI using the CSI-RS from the specific transmission point determined using information on the transmission point corresponding to the RSRP that satisfies the reporting condition in macro base station 100.

In ST104, terminal 300 reports the measured CSI to macro base station 100 (CSI feedback). That is, macro base station 100 receives the CSI measured using the specific CSI-RS indicated in the CSI-RS measurement list in terminal 300. Macro base station 100 sets a transmission method of the data signal (PDSCH) or a precoding matrix at each transmission point on the basis of the CSI feedback (PDSCH scheduling based on the CSI feedback). Thus, data and a DMRS are transmitted from each transmission point.

As shown in FIG. 8, the RSRP measurement using the CSI-RS is performed at a long interval (with low frequency) compared with the CSI measurement using the CSI-RS. Further, the CSI may be periodically reported (periodic CSI reporting), or may be reported according to a reporting request such as a trigger (aperiodic CSI reporting).

Next, in FIG. 8, a description will be given of a case where a new measurement result that satisfies the reporting condition is obtained as a result of the RSRP measurement based on the CSI-RS candidate list in terminal 300 (measuring section 303).

In ST105, similar to in ST102, terminal 300 reports information (CSI-RS candidate numbers and measurement results) relating to CSI-RS candidates (transmission points) corresponding to RSRPs that satisfy the reporting condition to macro base station 100. In FIG. 8, the RSRP of CSI-RS 1 is lower than the threshold Th_remove, and the RSRP of CSI-RS 3 is higher than the threshold Th_add. Accordingly, in ST105, terminal 300 reports CSI-RS 1 and CSI-RS 3 to macro base station 100. It is not necessary to report measurement results for CSI-RS candidates in which the RSRP is lower than the threshold Th_remove. Thus, in FIG. 8, terminal 300 reports information (remove) indicating that the RSRP is lower than the threshold Th_remove, instead of the measurement result (value 1), with respect to CSI-RS1, in order to reduce the amount of reporting information.

In ST106, similar to in ST103, control section 101 of macro base station 100 generates the CSI-RS measurement list (CML), and reports the CSI-RS measurement list to terminal 300. Here, control section 101 resets a CSI measurement and reporting target on the basis of the information received in ST105. For example, in FIG. 8, control section 101 removes CSI-RS 1 among CSI-RS 1 and CSI-RS 2 that are the CSI measurement and reporting targets in ST104 from the CSI measurement and reporting targets, and newly adds CSI-RS 3 to the CSI measurement and reporting targets. Accordingly, in ST106, macro base station 100 reports the CSI-RS measurement list that includes CSI-RS 1 and CSI-RS 2 to terminal 300.

Thus, measuring section 303 of terminal 300 measures the CSI (CQI and PMI) using the CSI-RSs (CSI-RS 2 and CSI-RS 3) indicated in the CSI-RS measurement list. Accordingly, in ST107, the CSI feedback for the CSI-RS 1 and CSI-RS 2 is performed.

Thereafter, the same processes are continuously performed in macro base station 100 and terminal 300.

In this way, in macro base station 100, transmitting section 102 transmits the CSI-RS to terminal 300, control section 101 determines a specific base station that is a measurement target of the CSI (second quality) from among a plurality of base stations on the basis of the reception power (first reception quality) of each base station which is measured using the CSI-RSs from the plurality of base stations (transmission points) in terminal 300, and receiving section 103 receives the CSI for the specific base station measured using the CSI-RS from the specific base station in terminal 300. Further, in terminal 300, measuring section 303 measures the reception power (first reception quality) for each base station using the CSI-RSs from a plurality of base stations (transmission points) in a coverage area of macro base station 100, and measuring section 303 measures the CSI (second reception quality) for the specific base station using the CSI-RS of the specific base station determined on the basis of the reception power (first reception quality) of each base station and reports the measured CSI to macro base station 100.

That is, terminal 300 performs measurement of the reception power (RSRP or the like) before the CSI measurement and reporting is performed, and reports the CSI-RS used by a transmission point having a higher reception power to macro base station 100. Thus, macro base station 100 can narrow down and set CSI-RSs that are CSI measurement and reporting targets from a plurality of CSI-RSs set at a plurality of transmission points that are present in a macro cell.

Here, as shown in FIG. 8, the reporting period of the reception power (RSRP) is longer than the reporting period of the CSI. Further, the processing burden of the measurement process of the reception power is smaller than that of the measurement process of the CSI that includes detailed information such as CQI and PMI. Further, the amount of information (bit rate or the like) necessary for indicating the reception power is less than the amount of information necessary for indicating the CSI. That is, reduction in the amount of feedback necessary for narrowing down the CSI-RSs (transmission points) that are the CSI measurement and reporting targets has a great influence on a system, compared with increase in the amount of feedback necessary for terminal 300 to report the information (CSI-RS candidate numbers, reception powers and the like) on the CSI-RS candidates (transmission points) that satisfy the reporting condition to macro base station 100 before the CSI measurement. That is, compared with a case where terminal 300 reports the CSI measurement result at all the transmission points, a case where terminal 300 reports CSI-RS candidates that satisfy a predetermined condition to macro base station 100 beforehand to limit transmission points (base stations) that are CSI measurement targets has a large effect of reduction in the amount of feedback.

In this way, it is possible to select an appropriate transmission point while reducing overhead for CSI reporting.

Further, in the present embodiment, macro base station 100 indicates the CSI-RS candidate list to terminal 300. Thus, terminal 300 can perform measurement and setting of transmission and reception timings for each transmission point in advance. Thus, when a transmission point used for transmission of user data is changed, terminal 300 can use a transmission point that is a change destination without generating delay for synchronization with a transmission point that is the change destination.

In the present embodiment, a description has been given of the case where terminal 300 continuously performs the reception power (RSRP) measurement using the CSI-RSs and reports, when the measurement result satisfies the reporting condition, the information relating to the CSI-RS candidates (transmission points) that satisfy the reporting condition to macro base station 100 (for example, see FIG. 8). However, in the present embodiment, the reporting of the CSI-RS candidates that satisfy the reporting condition is not limited to the way described in the embodiment, and may be performed in a way to be described below. Hereinafter, reception power reporting methods 1 and 2 will be described.

<Reporting Method 1>

When determining that a reception quality or throughput of a signal from a transmission point that is currently used for terminal 300 is degraded, macro base station 100 indicates to terminal 300 a reporting request of a measurement result of reception power. The reporting request may include a measurement method or CSI-RS numbers of reporting targets. Upon reception of the reporting request from macro base station 100, terminal 300 reports the measurement result of a designated CSI-RS (all CSI-RSs when there is no designation). Thus, terminal 300 performs the CSI-RS reception power measurement and reporting only when it is necessary to change a transmission point. Accordingly, it is possible to reduce power consumption in terminal 300, and to reduce the amount of reporting information. Further, macro base station 100 can cause terminal 300 to report the CSI-RS reception measurement result at a timing when a transmission point is desired to be changed due to a crowded situation of respective transmission points or the like. Further, when the reporting condition is set, terminal 300 transmits the first reception quality to macro base station 100 immediately after the reception quality measured using the CSI-RS is obtained, so that base station 100 can immediately update the second information. Consequently, base station 100 can flexibly switch transmission points for scheduling in terminal 300.

As in the present embodiment, terminal 300 may report only the information (CSI-RS candidate numbers and measurement results) on CSI-RSs (transmission points) that satisfy the reporting condition, upon reception of the reporting request. Reporting of the reporting request and the measurement result may be realized by RRC signaling. Here, when the reporting of the reporting request and the measurement result is performed by MAC or PHY signaling, it is possible to reduce delay from the reporting request to the reporting of the measurement result.

<Reporting Method 2>

Terminal 300 performs, when the CSI-RS candidate list is indicated by macro base station 100, the CSI-RS reception power measurement, and periodically reports measurement results of all CSI-RSs (or designated CSI-RSs) to macro base station 100. Here, the reporting period is separately indicated by macro base station 100. Thus, macro base station 100 can continuously monitor the state (reception quality from each transmission point) of terminal 300.

[Embodiment 2]

In Rel. 10, in order to reduce interference to the CSI-RS, a zeroTxPowerCSI-RS (non-transmission CSI-RS) is set (configured). In the present embodiment, a CoMP operation using the non-transmission SCI-RS is performed.

Figure 10:
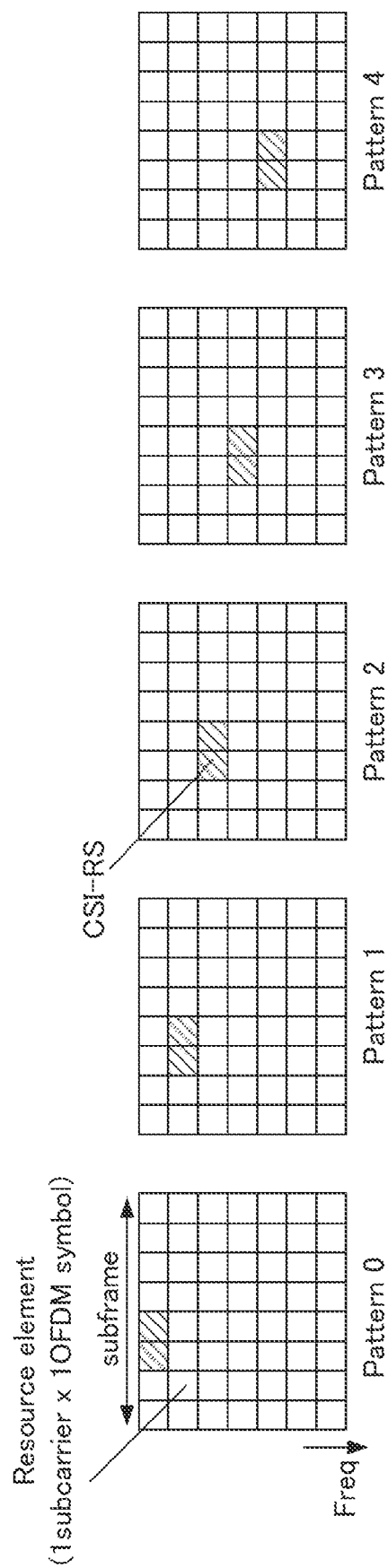
FIG. 10 is a diagram illustrating examples of mapping of CSI-RSs in one subframe according to Embodiment 1 of the invention.
Figure 11:
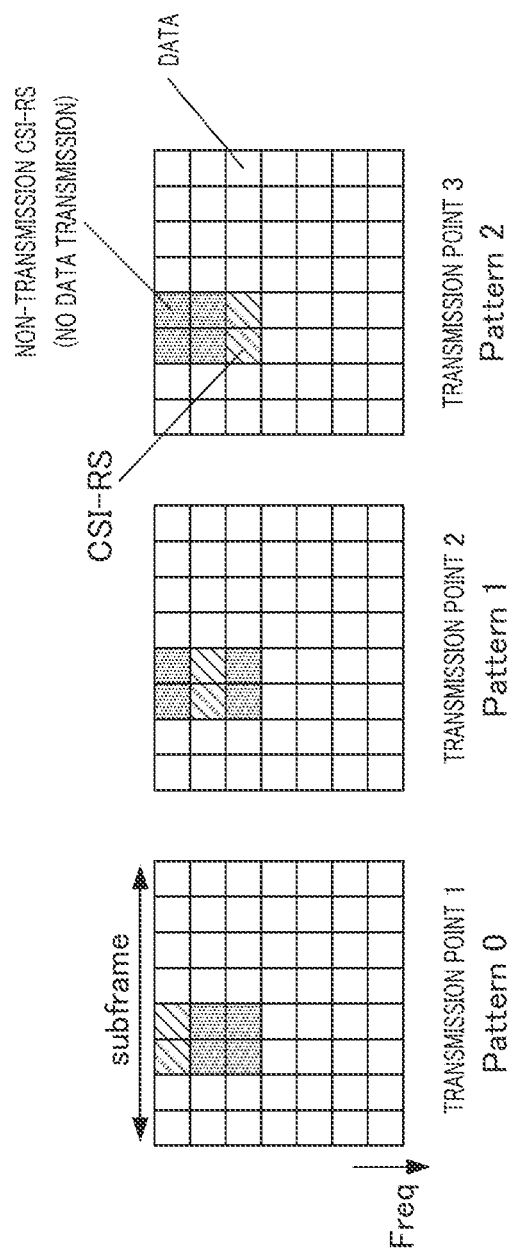
FIG. 11 is a diagram illustrating an example of a non-transmission CSI-RS resource according to Embodiment 2 of the invention.

For example, FIG. 11 is a diagram illustrating an example of a mapping pattern of CSI-RSs in one subframe at each transmission point. In FIG. 11, Pattern 0 to Pattern 2 (see FIG. 10) are set for transmission points 1 to 3, respectively. As shown in FIG. 11, resources including resources of CSI-RSs set for each of the transmission points 1 to 3 are set as resources of zeroTxPowerCSI-RSs (non-transmission CSI-RSs). As shown in FIG. 11, a data signal (PDSCH) is not mapped to the resources of the non-transmission CSI-RSs. Further, as shown in FIG. 11, for the resources of the non-transmission CSI-RSs, the CSI-RSs transmitted from each of the transmission points are allocated different resources, respectively. Further, in Rel. 10, resources of the non-transmission CSI-RSs are set at a timing of a predetermined period (for example, period of 5 ms) (not shown in FIG. 11).

That is, as shown in FIG. 11, in a resource group that forms the non-transmission CSI-RSs, only the CSI-RS at the transmission point is transmitted in a resource that is allocated to a CSI-RS at a certain transmission point, and the data signal (PDSCH) and the CSI-RSs at the other transmission points are not transmitted. For example, at transmission point 1 shown in FIG. 11, the CSI-RS is transmitted in the resource allocated to the CSI-RS at transmission point 1 among the resources of the non-transmission CSI-RSs. On the other hand, at transmission point 1 shown in FIG. 11, no data is transmitted in any resources (that is, resources allocated to CSI-RSs at transmission points 2 and 3) other than the resource allocated to the CSI-RS at transmission point 1, among the resources of the non-transmission CSI-RSs. The same applies to the other transmission points 2 and 3. In this way, in a resource allocated to a CSI-RS at a certain transmission point, there is no CSI-RS or data to be transmitted from a different transmission point, so that interference to the CSI-RS is reduced.

Here, for example, a terminal connected to transmission point 1 shown in FIG. 11 receives the CSI-RS transmitted from transmission point 1 in the resource of the CSI-RS (CSI measurement target) at transmission point 1. On the other hand, the terminal connected to transmission point 1 shown in FIG. 11 can also receive the CSI-RS transmitted from transmission point 2 (or transmission point 3) in the resource of the CSI-RS at transmission point 2 (or transmission point 3) among the resources of the non-transmission CSI-RSs. That is, the terminal can receive a different CSI-RS in addition to the CSI-RS of the CSI measurement target, in the resources of the zeroTxPowerCSI-RSs (non-transmission CSI-RSs).

Thus, in the present embodiment, the terminal measures reception powers of the CSI-RSs transmitted from the plurality of base stations (transmission points) using the resources of the non-transmission CSI-RSs (zeroTxPowerCSI-RSs), instead of the CSI-RS candidate list in Embodiment 1.

Hereinafter, macro base station 100 (FIG. 5), pico base station 200 (FIG. 6) and terminal 300 (FIG. 7) according to the present embodiment will be described.

[Configuration of Macro Base Station 100]

In macro base station 100, control section 101 performs the following processes in addition to the operation of control section 101 described in Embodiment 1. Here, control section 101 does not create the CSI-RS candidate list.

Control section 101 sets (configures) a resource group that includes resources of CSI-RSs used at transmission points in the cell (macro cell) covered by macro base station 100 as resources of non-transmission CSI-RSs (zeroTxPowerCSI-RSs). Control section 101 may set resources of non-transmission CSI-RSs that include only resources of CSI-RSs set for transmission points in the vicinity of control target terminal 300.

Here, resource information on the non-transmission CSI-RSs (zeroTxPowerCSI-RS information) is expressed by (1) a period and a time offset of the CSI-RS (one subframe-Config), and (2) a time/frequency resource position in a subframe (one or a plurality of resourceConfigs). In Rel. 10, only one combination of the period and time offset (subframe offset) can be set (configured) for zeroTxPowerCSI-RSs. That is, the subframe of zeroTxPowerCSI-RSs is shared by the transmission points in the macro cell.

The resource information on the non-transmission CSI-RSs are set in RRC parameters (zeroTxPowerCSI-RS). For example, macro base station 100 indicates the CSI-RS configuration used for the non-transmission CSI-RSs as a bit map in the mapping relation between the CSI-RS configuration and physical resource that are predetermined as shown in FIGS. 9 and 10. For example, if indication information is "0 1 0 0 1", in terminal 300, CSI-RSs that use resources of Pattern 1 and Pattern 4 among Pattern 0 to Pattern 4 shown in FIG. 10 are set as the non-transmission CSI-RSs.

Further, control section 101 sets the period of the CSI-RS set for each transmission point in the macro cell covered by macro base station 100 to an integral multiple (N times) of the period of the non-transmission CSI-RS.

Further, control section 101 sets the period of the CSI-RS (reception power measurement period) used for time averaging in reception power measurement in the resources of the non-transmission CSI-RSs.

The resource information on the non-transmission CSI-RSs (zeroTxPowerCSI-RS information) and the reception power measurement period set as described above are indicated to terminal 300 through transmitting section 102. Further, the resource information on the non-transmission CSI-RSs, the reception power measurement period and the CSI-RS period set for each transmission point (integral multiple of the period of the non-transmission CSI-RS) are indicated to each transmission point (pico base station 200) through inter-base station IF 104. Macro base station 100 may indicate only the value of N as information indicating the period of the CSI-RS set for each transmission point.

Transmitting section 102 performs the following processes in addition to the operation of transmitting section 102 described in Embodiment 1.

Transmitting section 102 does not map a data signal (PDSCH) to the resource of the non-transmission CSI-RS set in control section 101. Further, even in the resource of the non-transmission CSI-RS, transmitting section 102 transmits the CSI-RS in the corresponding resource when the resource is a resource designated in the CSI-RS configuration of the macro base station (macro base station 100).

[Configuration of Pico Base Station 200]

In pico base station 200 according to the present embodiment, transmitting section 202 performs the following processes in addition to the operation of transmitting section 202 described in Embodiment 1. Transmitting section 202 does not map a data signal (PDSCH) to the resource of the non-transmission CSI-RS set in macro base station 100. Further, even in the resource of the non-transmission CSI-RS, transmitting section 202 transmits the CSI-RS in the corresponding resource when the resource is a resource designated in the CSI-RS configuration of the transmission point (pico base station 200).

[Configuration of Terminal 300]

Receiving section 301 receives resource information on the non-transmission CSI-RS and information on the reception power measurement period, in addition to the operation of receiving section 301 described in Embodiment 1. The resource information on the non-transmission CSI-RS is output to control section 302 and measuring section 303, and the information on the reception power measurement period is output to measuring section 303.

Control section 302 outputs resource information on the CSI-RS that is a reception power measurement target on the basis of the resource information on the non-transmission CSI-RS to receiving section 301, in addition to the operation of control section 302 described in Embodiment 1.

Measuring section 303 performs the reception power measurement using the CSI-RS, on the basis of the resource information on the non-transmission CSI-RS and the information on the reception power measurement period, in addition to the operation of measuring section 303 described in Embodiment 1. For example, measuring section 303 measures reception power for each reception power measurement period using the CSI-RS transmitted from any transmission point in time/frequency resources in each subframe, designated in resourceConfig set as the non-transmission CSI-RS. That is, measuring section 303 measures reception power for each base station using the CSI-RSs transmitted from a plurality of transmission points in the resource group of the non-transmission CSI-RSs set at a timing of a predetermined period (subframeConfig).

When reporting the reception power measured using the CSI-RS in addition to the operation of Embodiment 1, transmitting section 304 includes offset information, in addition to resourceConfig numbers of zeroTxPowerCSI-RSs (that is, information indicating the order of the resource configuration corresponding to the resource of the non-transmission CSI-RS), as information on CSI-RSs (transmission points) that satisfy a predetermined condition (reporting condition).

[Operations of Macro Base Station 100 and Terminal 300]

Figure 12:
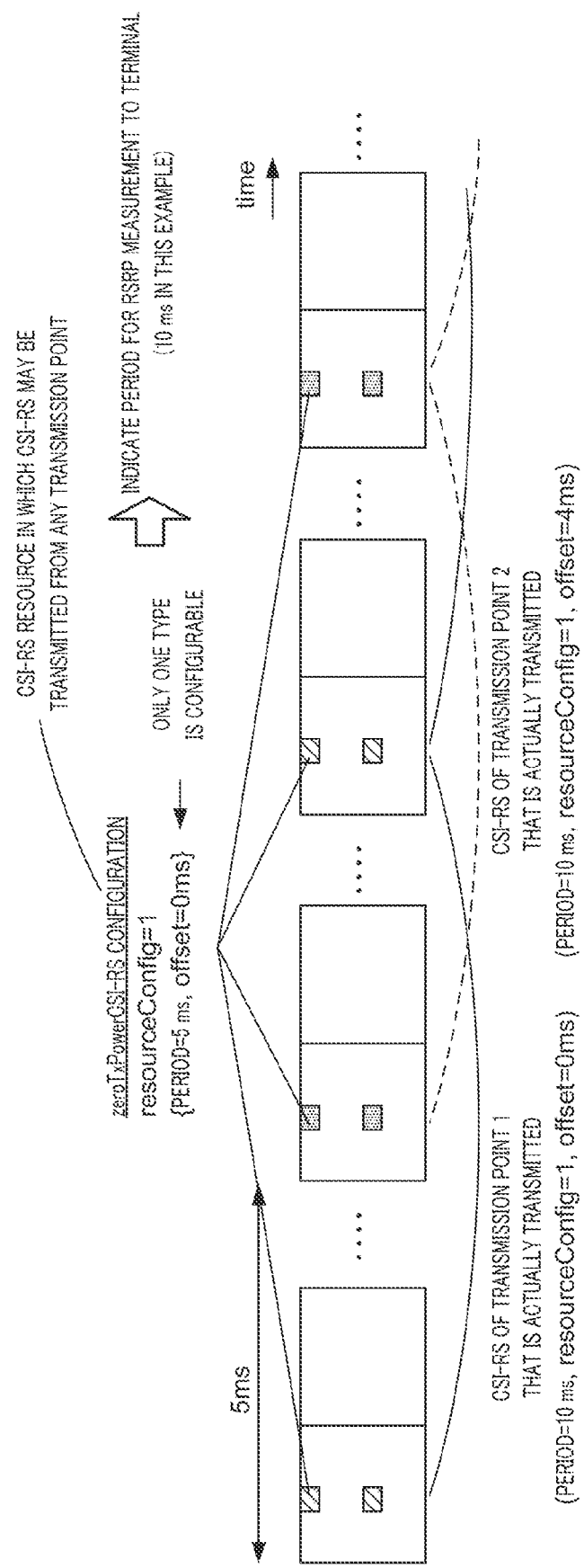
FIG. 12 is a diagram illustrating a setting example of a CSI-RS according to Embodiment 2 of the invention.

FIG. 12 is a diagram illustrating an example of setting of the non-transmission CSI-RS (zeroTxPowerCSI-RS), setting of the CSI-RS for each transmission point, and setting of the reception power period in terminal 300, as described above.

In FIG. 12, as a resource of the non-transmission CSI-RS, resourceConfig=1 and subframe Config=(period of 5 ms and offset of 0 ms) are set. That is, as shown in FIG. 12, the resource of the non-transmission CSI-RS is set every 5 ms.

Further, in FIG. 12, as a resource of the CSI-RS at transmission point 1, resouceConfig=1 and period=10 ms and offset=0 ms are set. Similarly, in FIG. 12, as a resource of the CSI-RS at transmission point 2, resourceConfig=1, period=10 ms, and offset=4 ms are set. That is, the period (10 ms) of the CSI-RS set for each transmission point is two times (N=2) the period (5 ms) of the non-transmission CSI-RS.

Further, in FIG. 12, as the reception power measurement period in terminal 300, 10 ms is set.

Accordingly, measuring section 303 of terminal 300 performs the reception power measurement using the CSI-RS transmitted from transmission point 1 at the period of 10 ms from offset=0 ms (for example, subframe 0). Further, measuring section 303 performs the reception power measurement using the CSI-RS transmitted from transmission point 2 at the period of 10 ms from offset=4 ms (for example, subframe 4). That is, in FIG. 12, terminal 300 performs two types of reception power measurements of the reception power measurement using the CSI-RS extracted at the period of 10 ms from subframe 0 (offset=0 ms) and the reception power measurement using the CSI-RS extracted at the period of 10 ms from subframe 4 (offset=4 ms), and performs time averaging for each of the reception power measurements.

In this way, terminal 300 receives the CSI-RS transmitted from any transmission point in each resource in which the non-transmission CSI-RS is set, and measures the reception power. That is, in the present embodiment, the resource information on the non-transmission CSI-RS (zeroTxPowerCSI-RS) is used instead of the CSI-RS candidate list (information on the CSI-RS set for each transmission point) used in Embodiment 1.

Thus, the indication of the CSI-RS candidate list is no longer necessary compared with Embodiment 1, and thus, it is possible to reduce the amount of indication information. That is, compared with Rel. 10, it is not necessary to set new indication information (Information Element: IE), and thus, it is possible to reduce system complexity, and to reduce the man-hours for testing base stations and terminals.

Further, in a resource that is allocated to a CSI-RS at a certain transmission point in the resource of the non-transmission CSI-RS, no signal other than the CSI-RS of the corresponding transmission point is transmitted, so that terminal 300 can perform the reception power measurement using the CSI-RS with high accuracy.

Further, as shown in FIG. 11, in the resource of the CSI-RS used by each transmission point, no data signal (PDSCH) is transmitted. Thus, it is not necessary to change the mapping pattern of data signals (PDSCH) in a resource block whenever the transmission points for terminal 300 are switched in the macro cell, so that the complexity of terminal 300 can be reduced.

To reduce the amount of indication information from macro base station 100 to terminal 300, it is preferable to set only one period of the non-transmission CSI-RS (zero-TxPowerCSI-RS) and only one subframe offset. Here, if the resource of the non-transmission CSI-RS (zero-TxPowerCSI-RS) is set as a measurement target resource of the CSI-RS at each transmission point, CSI-RSs at different transmission points in the cell are transmitted in the same subframe. In this case, the resource for the data signal (PDSCH) is extremely reduced, which in turn causes degradation of the throughput.

On the other hand, in the present embodiment, macro base station 100 sets the period of the CSI-RS at each transmission point to an integral multiple of the period of the non-transmission CSI-RS (zeroTxPowerCSI-RS), and sets different offsets between the transmission points. Further, macro base station 100 indicates to terminal 300 the period of the subframe used for the reception power measurement in addition to the resource information on the non-transmission CSI-RS (zero-TxPowerCSI-RS). Further, terminal 300 measures the reception power at the indication period of the reception power measurement. Thus, it is possible to transmit the CSI-RS at each transmission point in dispersed subframes. Thus, it is possible to prevent the CSI-RS at each transmission point from being concentrated only in a certain subframe and to avoid degradation of the data throughput.

Further, when terminal 300 reports the reception power measurement result to macro base station 100, terminal 300 also reports information on the subframe offset used for the reception power measurement, in addition to a resourceConfig number of the CSI-RS that satisfies a reporting condition. Thus, macro base station 100 can determine that the CSI-RS that satisfies the reporting condition is a CSI-RS at a certain transmission point, and can appropriately set the CSI-RS that is the CSI measurement reporting target for terminal 300.

In this way, according to the present embodiment, it is possible to select an appropriate transmission point while reducing the overhead for CSI reporting. Further, according to the present embodiment, it is possible to reduce indication information necessary for the CSI measurement and reporting, compared with Embodiment 1.

The operation of the present embodiment and the operation of Embodiment 1 may be switched as necessary. In this case, macro base station 100 may select the use of the non-transmission CSI-RS (zeroTxPowerCSI-RS) instead of the CSI-RS candidate list (application of the present embodiment) or new indication of the CSI-RS candidate list (application of Embodiment 1), and may indicate the result to terminal 300. For example, when the amount of indication information is desired to be extremely reduced, a flexible operation such as the use of the zeroTxPowerCSI-RS instead of the CSI-RS candidate list may be performed.

Further, in the present embodiment, the case where the resource of the non-transmission CSI-RS (zeroTxPowerCSI-RS) is set as the resource of the CSI-RS that is the reception power measurement target (that is, CSI-RS candidate list) has been described. However, in the present embodiment, only a part of the resource of the non-transmission CSI-RS (zeroTxPowerCSI-RS) may be set as the resource of the reception power measurement target. In this case, macro base station 100 indicates to terminal 300 information indicating which resourceConfig of the resource of the non-transmission CSI-RS (zeroTxPowerCSI-RS) is set as the reception power measurement target. This is effective when the resource of non-transmission CSI-RS (zeroTxPowerCSI-RS) and the resource of CSI-RS of the reception power measurement target are different from each other, for example, when a resource of a CSI-RS used in an adjacent cell (different cell ID) is included as the non-transmission CSI-RS resource, when only a resource of a CSI-RS used at a transmission point in the vicinity of terminal 300 is a measurement target, or the like.

Further, in the present embodiment, the case where only one information item that includes the transmission period and subframe offset is set as the non-transmission CSI-RS (zeroTxPowerCSI-RS) has been described. However, the information that includes the transmission period and subframe offset may be indicated for each resource of the non-transmission CSI-RS (zeroTxPowerCSI-RS). Thus, it is possible to set the non-transmission CSI-RSs into a plurality of subframes in a distributed manner and to prevent the amount of the resources for PDSCH from being reduced in one subframe.

[Embodiment 3]

In the present embodiment, a method of selecting a transmission point after a handover between macro cells (between cells of different cell IDs) will be described.

Hereinafter, macro base station 100 (FIG. 5), pico base station 200 (FIG. 6) and terminal 300 (FIG. 7) according to the present embodiment will be described.

[Configuration of Macro Base Station 100]

In macro base station 100, control section 101 performs the following processes (operation relating to transmission point selection in a different cell) in addition to the operation of control section 101 described in Embodiment 1 (operation relating to transmission point selection in a macro cell).

Control section 101 determines, for each terminal 300, the configuration of measurement (reception power measurement using CRS) in which a different cell (adjacent cell, that is, transmission points having a cell ID different from a plurality of transmission points in the area covered by macro base station 100) is a measurement target. As the configuration of measurement (measurement configuration: measConfig), a carrier frequency of a measurement target, information on a cell ID, a measurement method (RSRP, RSRQ or the like), a reporting condition of measurement report, or the like may be used. The measurement configuration (measConfig) is indicated to each terminal 300 through transmitting section 102.

Further, control section 101 generates configurations of CSI-RSs used at the respective transmission points in a different cell that is a measurement target (a plurality of transmission points having the same cell ID as that of the different cell that is the measurement target) as a "CSI-RS candidate list" of the different cell. The "CSI-RS candidate list" of the different cell is indicated to each terminal 300 through transmitting section 102. Here, control section 101 may include only CSI-RSs used at transmission points of the different cell positioned in the vicinity of configuration target terminal 300 in the "CSI-RS candidate list" of the different cell and configures the CSI-RSs as a measurement target of reception power.

Further, control section 101 determines whether or not to perform a handover to the different cell, on the basis of report of a measurement result (measurement report, that is, a reception power measurement result using CRS) from each terminal 300 received through receiving section 103 or inter-base station IF 104. When a handover to the different cell is performed, control section 101 outputs information necessary for execution of the handover to inter-base station IF 104.

Further, control section 101 determines the configurations of CSI-RSs (that is, transmission points) that are CSI measurement and reporting targets in the different cell, using information (identifiers of CSI-RS resources that satisfy a predetermined condition that is a reference for whether or not to perform reporting of a reception power measurement result using a CSI-RS (reporting condition of the reception power measurement result using the CSI-RS), and the reception power measurement result) relating to the CSI-RSs of the different cell, included in a signal (received signal) from each terminal 300 received through receiving section 103 or inter-base station IF 104. Control section 101 sets the determined configurations of the CSI-RSs as the "CSI-RS candidate list" of the different cell.

The CSI-RSs transmitted from a plurality of transmission points having the same cell ID as that of the different cell that is the measurement target are transmitted in different resources for the respective transmission points, and the CRSs are transmitted in resources determined on the basis of the cell ID of the different cell.

Inter-base station IF 104 indicates the handover information input from control section 101 to a different base station and exchanges information necessary for the handover with the different base station.

[Configuration of Terminal 300]

In terminal 300, measuring section 303 measures reception power using the CRS according to a frequency, a cell ID and the like included in the measurement setting (measConfig) received through receiving section 301. The measurement method of the reception power using the CRS corresponds to a measurement method (RSRP, RSRQ or the like) designated in the measurement configuration (measConfig). Further, measuring section 303 determines whether the reception power measurement result using the CRS satisfies the reporting condition included in the measurement configuration (measConfig). When the reception power measurement result using the CRS satisfies the reporting condition, measuring section 303 transmits information on the different cell that is the measurement target (for example, frequency, cell ID and the like) and the measurement result (result of reception power measurement using the CRS) to macro base station 100 or pico base station 200 through transmitting section 304.

Further, when the result of reception power measurement using the CRS in the different cell satisfies the measurement reporting condition, measuring section 303 measures, using a plurality of CSI-RSs indicated in the CSI-RS candidate list of the different cell, reception power corresponding to each of the plurality of CSI-RSs. Further, measuring section 303 transmits the measurement result (CSI-RS number, measurement value and the like) to macro base station 100 or pico base station 200 through transmitting section 304. That is, when the reception power measured using the CRS from the different macro base station (different cell) outside the coverage area of macro base station 100 satisfies the measurement reporting condition, measuring section 303 measures, using CSI-RSs from transmission points in a coverage area of the macro different base station (a plurality of pico base stations deployed in coverage areas of a different base station and the different macro base station), a reception power for each transmission point of the different base station. Here, as described above, the CSI-RS is transmitted in a different resource for each transmission point. Further, the CRSs use different resources in the transmission points in the coverage area of macro base station 100 and the transmission points in the coverage area of the different macro base station, and are transmitted in the same resource in the transmission points in each of the coverage areas (for example, see FIG. 1). Terminal 300 may report only the measurement result of the CSI-RS having a higher measurement value (higher reception power) among the CSI-RSs indicated in the CSI-RS candidate list, or may report only the measurement result of the CSI-RS having a measurement value that satisfies a predetermined reference value. In this way, it is possible to reduce the number of the CSI-RS measurement results to be reported, and thus, to reduce the size of a message used for reporting.

[Operations of Macro Base Station 100 and Terminal 300]

The operations of macro base station 100 and terminal 300 having the above-described configurations will be described. Hereinafter, reporting methods 1 and 2 of the result of reception power measurement in terminal 300 using the CSI-RS at the transmission point of the different cell will be described.

<Reporting Method 1 (FIG. 13)>

Figure 13:
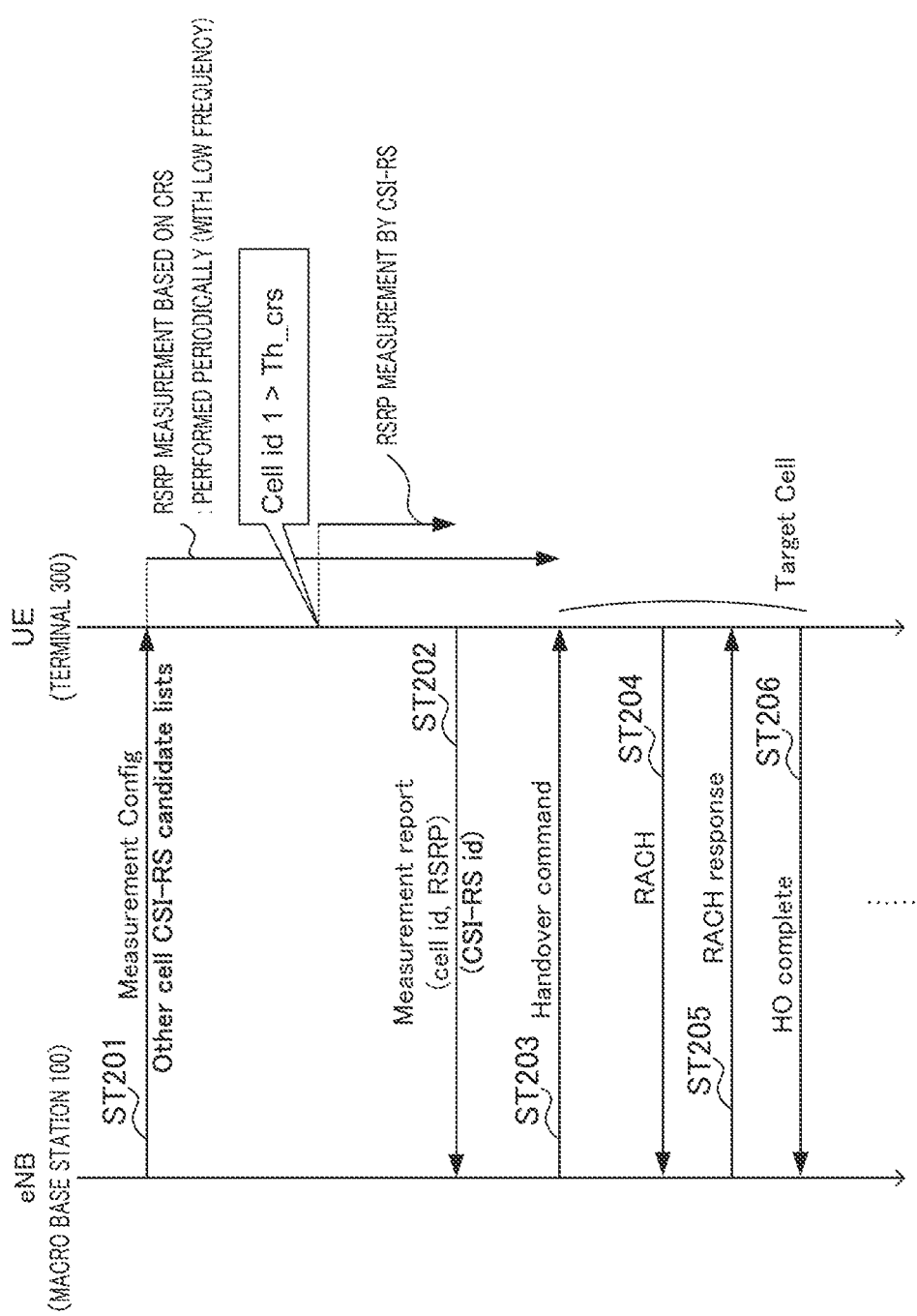
FIG. 13 is a diagram illustrating processes of a macro base station and a terminal according to Embodiment 3 of the invention (reporting method 1)

FIG. 13 is a flowchart illustrating the flow of processes of macro base station 100 (indicated as eNB) and terminal 300 (indicated as UE).

In FIG. 13, in ST201, macro base station 100 sets the measurement configuration (parameters of reception power measurement that uses CRSs (cell ID of the different cell that is the measurement target, measurement method and the like)) set by control section 101, for each terminal 300, and indicates the configuration. Here, macro base station 100 also indicates the CSI-RS candidate list (other cell CSI-RS candidate lists) for the different cell that is the measurement target to terminal 300.

Measuring section 303 of terminal 300 performs reception power (for example, RSRP) measurement that uses a CRS, when the measurement configuration is received in ST201. Further, measuring section 303 determines whether the measurement result that uses the CRS satisfies a reporting condition. For example, as the reporting condition, it is determined whether the measurement result is higher than a predetermined threshold Th_crs. If the measurement result that uses the CRS (measurement result of cell with cell id 1 in FIG. 13) is higher than the threshold Th_crs, measuring section 303 performs reception power (for example, RSRP) measurement that uses a CSI-RS, on the basis of the CSI-RS candidate list of the corresponding cell (cell with cell id 1).

Upon completion of the reception power (for example, RSRP) measurement that uses the CSI-RS in ST202, terminal 300 reports a measurement report that includes the reception power measurement result that uses the CRS (cell id that satisfies the measurement reporting condition, measurement value and the like) and the result of reception power measurement that uses the CSI-RS (CSI-RS id, measurement value and the like) to macro base station 100.

In ST203, macro base station 100 determines whether to allow terminal 300 to perform a handover or not on the basis of the measurement report received from terminal 300 in ST202. When allowing terminal 300 to perform a handover, macro base station 100 exchanges information (terminal information, configuration information and the like) necessary for the handover with a handover destination base station and indicates to terminal 300 a handover instruction as a handover command and configuration information on the handover destination.

In ST204, terminal 300 transmits a RACH to the handover destination base station on the basis of the configuration information received from macro base station 100 in ST203.

In ST205, upon detection of the RACH from terminal 300 in ST204, the base station that is the handover destination of terminal 300 transmits a RACH response to terminal 300.

In ST206, upon reception of the RACH response from the handover destination base station in ST205, terminal 300 transmits a handover completion message (HO complete) in an uplink resource indicated in the RACH response.

In this way, after the result of reception power measurement that uses the CRS satisfies the reporting condition, terminal 300 starts the reception power measurement that uses the CSI-RS based on the CSI-RS candidate list. That is, terminal 300 reports the reception power (RSRP) for each of a plurality of CSI-RSs, measured using a plurality of CSI-RSs from a different cell (here, a cell with cell id 1, that is, transmission points) and a plurality of transmission points having the same cell ID as that of the different cell, at a reporting timing of the result of reception power measurement of the CRS that satisfies the measurement reporting condition. Thus, in the present embodiment, compared with the case where the reception power measurement that uses the CSI-RS is constantly performed, it is possible to reduce power consumption in terminal 300.

Further, terminal 300 reports a result of reception power measurement that uses a CSI-RS for transmission points in a cell of a different macro base station at the reporting timing of the result of reception power measurement that satisfies the measurement reporting condition of measurement (result of reception power measurement that uses the CRS). That is, terminal 300 reports the result of reception power measurement that uses the CRS and the result of reception power measurement that uses the CSI-RS to macro station 100 as the same message (measurement report in FIG. 13). Thus, it is possible to reduce overhead such as a header necessary for reporting of each measurement result, CRC, or ACK/NACK for transmission of the message.

A CSI-RS measurement list (not shown in FIG. 13) indicating a CSI measurement and reporting target in a different macro base station that can be a handover destination may be included in the handover command (ST203 shown in FIG. 13). In this case, it is not necessary to additionally indicate the CSI-RS measurement list after completion of the handover, thereby further reducing delay.

<Reporting Method 2>

Figure 14:
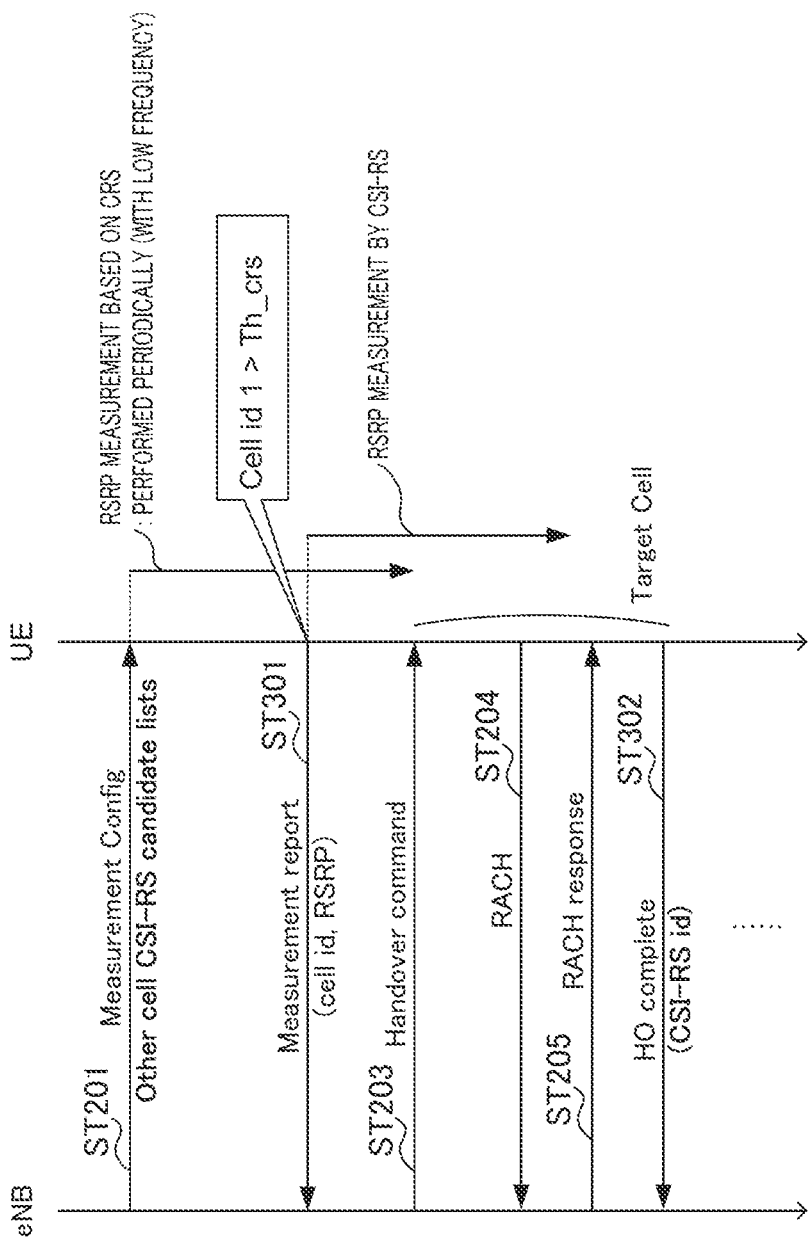
FIG. 14 is a diagram illustrating processes of a macro base station and a terminal according to Embodiment 3 of the invention (reporting method 2)

FIG. 14 is a flowchart illustrating the flow of processes of macro base station 100 (indicated as eNB) and terminal 300 (indicated as EU). In FIG. 14, the same reference signs are given to the same processes as in reporting method 1 (FIG. 13), and repetitive description thereof will be omitted.

In FIG. 14, in ST301, when a result of reception power measurement that uses a CRS (measurement result of a cell with cell id 1 in FIG. 14) is higher than a predetermined threshold Th_crs, measuring section 303 performs reception power (for example, RSRP) measurement that uses a CSI-RS on the basis of a CSI-RS candidate list of the cell, and reports the measurement report including a result of reception power measurement that uses a CRS to macro base station 100.

In ST302, upon reception of the RACH response from the handover destination base station in ST205, terminal 300 transmits a handover completion message (HO complete) in an uplink resource indicated in the RACH response. Here, the handover completion message includes the result of reception power measurement that uses the CSI-RS from the transmission points in the handover destination base station (different macro base station). That is, terminal 300 reports the result of reception power measurement that uses the CSI-RS for the transmission points in a coverage area of the different macro base station, at a transmission timing of the handover completion message from macro base station 100 to the different macro base station.

That is, reporting method 2 is different from reporting method 1 in that the result of reception power measurement that uses the CRS (measurement report) is reported to macro base station 100 without waiting for completion of the reception power measurement that uses the CSI-RS. That is, terminal 300 transmits the reception power (RSRP) for each of a plurality of CSI-RSs, measured using a plurality of CSI-RSs from a different cell (here, a cell with cell id 1, that is, transmission points) and a plurality of transmission points having the same cell ID as that of the different cell, at a reporting timing of the handover completion message to the different cell. Thus, the delay of the result of reception power measurement (measurement report) that uses the CRS is reduced, so that macro base station 100 can determine the handover at an earlier timing compared with reporting method 1. This is particularly effective when the time fluctuation of a transmission path is fast.

While the result of reception power measurement that uses the CSI-RS is included in the measurement report in reporting method 1 (ST202 shown in FIG. 13), the result of reception power measurement that uses the CSI-RS is included in the handover completion message in reporting method 2 (ST302 shown in FIG. 14). That is, in reporting method 2, the reporting of the result of reception power measurement that uses the CSI-RS is performed at a later timing compared with reporting method 1. However, the reception power measurement result that uses the CSI-RS is used for selection of a transmission point in a cell of the handover destination. That is, the result of reception power measurement that uses the CSI-RS is used after completion of the handover. Thus, there is no problem in that the result of reception power measurement that uses the CSI-RS is included in the handover completion message. Further, terminal 300 does not necessarily perform a handover even when the result of reception power measurement that uses the CRS satisfies the reporting condition. Accordingly, although reporting of the result of reception power measurement that uses the CSI-RS becomes useless when the handover is not performed in reporting method 1, in reporting method 2, the reporting does not become useless because the result of reception power measurement that uses the CSI-RS is reported after completion of the handover.

Hereinbefore, reporting methods 1 and 2 of the result of reception power measurement that uses the CSI-RS at the transmission points of the different cell have been described.

In this way, macro base station 100 indicates information on the CSI-RSs (CSI-RS candidate list) used at the transmission points of the different cell to terminal 300. Further, terminal 300 measures the reception power of the CSI-RSs used at the transmission points of the different cell, and reports the result to macro base station 100. Thus, macro base station 100 can select an appropriate transmission point to be used for data transmission after terminal 300 is handed over to the different cell while reducing delay. That is, in the present embodiment, compared with the case where the measurement result is reported by indicating the CSI-RS candidate list after completion of the handover, it is possible to reduce delay of the start of data transmission after the handover.

[Embodiment 4]

Rel. 10 supports communication using a band including a bundle of component carriers (CCs), so-called carrier aggregation (CA). The term "component carrier" refers to a band having a maximum width of 20 MHz, for example, which is defined as a basic unit of the communication band. Further, an extension carrier for the downlink (non-backward compatible carrier) has been studied in Rel. 11. In the extension carrier, only a DMRS is supported, and no CRS is transmitted for reduction of overhead (for example, see "3GPP TSG RAN WG1 meeting, R1-100359, January 2010"). That is, in the extension carrier, it is possible to perform highly efficient transmission because of the operation using only DMRSs.

A CSI-RS is mapped in the extension carrier. That is, in the extension carrier, the CSI-RS is mapped but the CRS different from the CSI-RS is not mapped.

It is assumed that the system used in the present embodiment uses a component carrier (CC) in which no CRS is transmitted, such as an extension carrier. That is, a terminal performs communication using a plurality of CCs.

Figure 15:
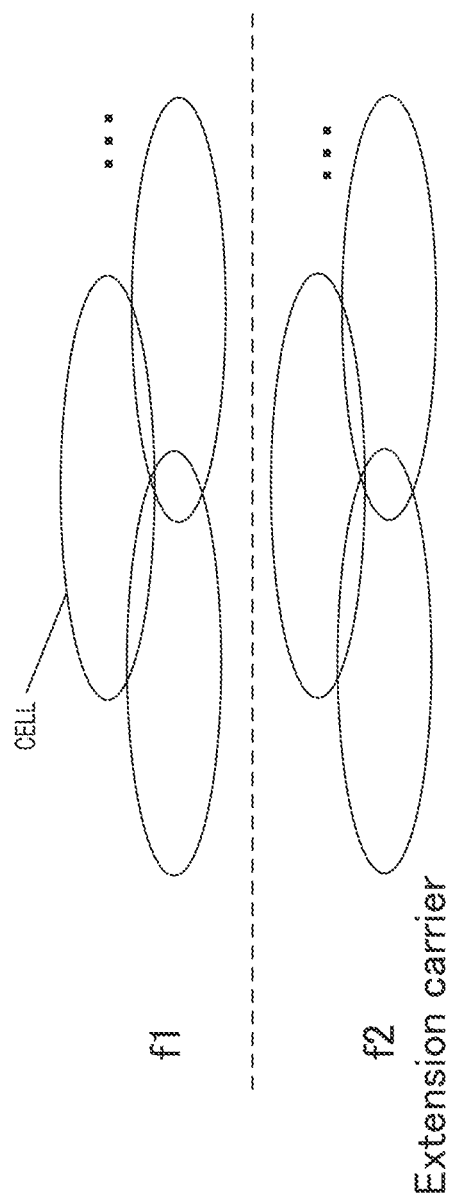
FIG. 15 is a diagram illustrating an example of an extension carrier according to Embodiment 4 of the invention.

The present embodiment may be applied to a heterogeneous network used in Embodiments 1 to 3, or may be applied to a homogeneous network configured by only a macro base station. Hereinafter, a case where the present embodiment is applied to the homogeneous network will be described (see FIG. 15).

Hereinafter, macro base station 100 (FIG. 5) and terminal 300 (FIG. 7) according to the present embodiment will be described.

[Configuration of Macro Base Station 100]

In macro base station 100, control section 101 performs the following processes in addition to the operation of control section 101 performed in Embodiment 1.

Control section 101 sets a measurement configuration used for a CC other than a currently used CC as a measurement target, for terminal 300. Here, when the measurement target CC is a normal CC (CC including a CRS), control section 101 sets the measurement configuration including a carrier frequency, a cell ID and the like of the CC. On the other hand, when the measurement target CC is an extension carrier (CC that does not include the CRS), control section 101 indicates configuration information on the extension carrier (a carrier frequency and a CSI-RS candidate list) to terminal 300 through transmitting section 102.

Further, control section 101 determines whether the CC is added for terminal 300, on the basis of a signal from terminal 300 received through receiving section 103. The signal from terminal 300 includes a measurement report for the normal CC (CC including the CRS) or a result of reception power measurement that uses the CSI-RS. That is, when the CC to be added is the normal CC (CC including the CRS), control section 101 determines the addition of the CC on the basis of the result of reception power measurement that uses the CRS. On the other hand, if the added CC is the extension carrier, control section 101 determines the addition of the CC on the basis of the result off reception power measurement that uses the CSI-RS. When the CC is added for terminal 300, control section 101 indicates a CC addition instruction to terminal 300.

[Configuration of Terminal 300]

In terminal 300, receiving section 301 extracts data from the CC configured in terminal 300 according to the configuration information such as a carrier frequency and the like of the CC, which is input from control section 302.

Upon reception of the CC addition instruction from macro base station 100 through receiving section 301, control section 302 outputs the configuration information such as a carrier frequency and the like of the CC to be added to receiving section 301.

When receiving the measurement configuration from macro base station 100 through receiving section 301, measuring section 303 performs reception power measurement that uses the CRS, on the basis of the configuration information (the carrier frequency, cell ID and the like) on the normal CC included in the measurement configuration. If the result of the measured reception power satisfies a reporting condition indicated by macro base station 100, the measurement result (measurement report for the normal CC) is transmitted to macro base station 100 through transmitting section 304.

On the other hand, upon reception of the configuration information on the extension carrier from macro base station 100 through receiving section 301, measuring section 303 performs reception power measurement that uses the CSI-RS in the carrier frequency instructed in the configuration information, on the basis of the CSI-RS candidate list included in the configuration information. If the measurement result of the measured reception power satisfies the reporting condition indicated by macro base station 100, the measurement result (result of the reception power measurement that uses the CSI-RS) is transmitted to macro base station 100 through transmitting section 304.

In this way, in the present embodiment, when the extension carrier (CC in which no CRS is not mapped) is newly added for terminal 300, in terminal 300, measuring section 303 measures the reception power using the CSI-RS transmitted from macro base station 100 at the frequency of the CC in which no CRS is mapped, and transmitting section 304 reports, when the result of reception power measurement that uses the CSI-RS measured in measuring section 303 satisfies a predetermined condition, the result of reception power measurement to macro base station 100. That is, terminal 300 performs the reception power measurement that uses the CSI-RS for the extension carrier in which no CRS is mapped, and reports the measurement result to macro base station 100 (CSI-RS based reception quality report). In this way, even when the extension carrier in which no CRS is mapped is used in carrier aggregation, macro base station 100 can select the extension carrier having a favorable channel state, and can configure the selected extension carrier for terminal 300.

The component carrier may be considered to serve as a cell defined by the carrier frequency and cell ID. Further, in carrier aggregation, one primary component carrier (referred to as a PCC or primary cell (PCell)) and one or a plurality of secondary component carriers (referred to as an SCC or secondary cell (Scell)) may be configured for each terminal. For example, the PCC (PCell) is a component carrier in which broadcast information (for example, system information block type 2 (SIB2)) is transmitted.

Further, the present invention is not limited to the extension carrier, and may be applied to any component carrier as long as no CRS is mapped and a CSI-RS is mapped in the component carrier.

Further, in the present embodiment, when the heterogeneous network is adopted, terminal 300 may measure, using a plurality of CSI-RSs transmitted from a plurality of transmission points, reception power of the plurality of CSI-RSs in the frequency of the CC in which no CRS is mapped, when the extension carrier (CC in which no CRS is mapped) is newly added for terminal 300, and may report a result of reception power measurement that satisfies a predetermined condition to macro base station 100.

[Embodiment 5]

In the present embodiment, a reception base station (or referred to as a reception point (RP)) in the uplink of each terminal is selected independently of a transmission base station (that is, transmission point (TP)) in the downlink. The number of the reception points selected for each terminal may be one or greater than one.

Figure 16:
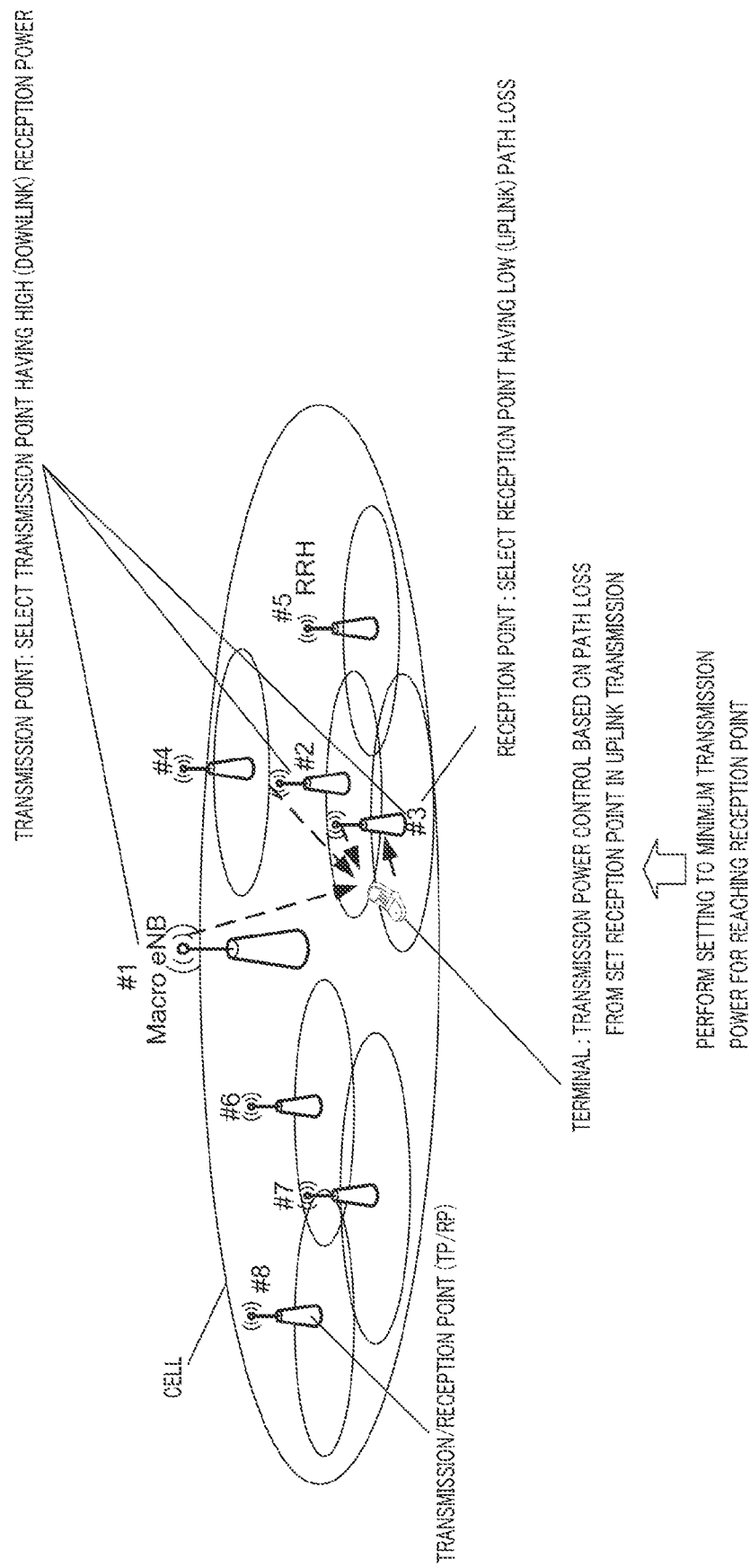
FIG. 16 is a diagram illustrating a CoMP operation according to Embodiment 5 of the invention.

FIG. 16 is a diagram illustrating an operation example of CoMP in the present embodiment. With respect to the terminal shown in FIG. 16, in the downlink, signals are transmitted from three transmission points #1, #2 and #3 in which RSRP (reception power) is higher than a predetermined threshold.

On the other hand, with respect to the terminal shown in FIG. 16, in the uplink, a signal transmitted from the terminal is received at one reception point #3 in which path loss (the amount of transmission attenuation between the reception point and the terminal) is lower than a predetermined threshold. Here, the terminal shown in FIG. 16 transmits the signal with such a transmission power that the signal can be received at reception point #3 with sufficient reception quality. For example, the terminal shown in FIG. 16 transmits the signal with such a low transmission power that the signal can be received at reception point #3 in the vicinity of the terminal. For example, the terminal uses RSRP measured using a signal from reception point #3 in calculation of coefficient PL (path loss) in transmission power control (transmission power control of LTE or LTE-A) expressed by the following Equation 1. The RSRP is measured using a CSI-RS, similar to in Embodiment 1.

[1]

$$P = \min\{P_{MAX}, 10\log_{10}(M) + P_0 + \alpha \cdot PL + \Delta_{TF} + f\} \quad \text{(Equation 1)}$$

(PL=referenceSignalPower−averaged RSRP)

In Equation 1, P represents transmission power of PUSCH (data), $P_{MAX}$ represents the maximum value of transmission power allowed in a terminal, M represents a transmission bandwidth, $P_0$ represents a value set per cell or terminal, α represents a coefficient of 1 or smaller, $\Delta_{TF}$ represents a value variable according to a modulation method or the like, and f represents a control value based on a transmission power control command. Further, referenceSignalPower represents transmission power at a reception point that is a reference of path loss calculation (hereinafter, a reception point that is a path loss reference). That is, a difference between transmission power at the reception point that is the path loss reference and an average value of RSRPs (higher layer filtered RSRPs) in the terminal is calculated as the path loss (the amount of transmission attenuation between the reception point and the terminal).

Here, in order for a base station to normally receive a signal from the terminal, recognition of the reception point is to be the same between the base station and the terminal. Thus, the base station is to indicate, to the terminal, information on the reception point (reception point that is the path loss reference) that the terminal uses for calculation of path loss (PL) in the transmission power control. Here, the path loss is calculated on the basis of the RSRP measured using the CSI-RS. Thus, the base station is to indicate, to the terminal, information on the CSI-RS (resource, timing or the like). Accordingly, when the reception point frequently changes due to movement or the like of the terminal, the overhead for indication of the information on the reception point increases.

Further, in order to obtain highly precise path loss in the terminal, sufficiently long averaging is to be performed. Thus, if the configuration information on the CSI-RS is indicated whenever the reception point changes, delay occurs in calculation of the highly precise path loss using a CSI-RS from the new reception point.

Thus, in the present embodiment, the CSI-RS candidate list used in the downlink in the above-described embodiments is also used for selection of the reception point (RP) in the uplink.

Hereinafter, macro base station 100 (FIG. 5), pico base station 200 (FIG. 6) and terminal 300 (FIG. 7) according to the present embodiment will be described.

[Configuration of Macro Base Station 100]

In macro base station 100, control section 101 performs the following processes (operation relating to reception point selection) in addition to the operation (operation relating to transmission point selection) of Embodiment 1.

Control section 101 sets a reporting condition for reception point selection in the uplink, in addition to the reporting condition for the transmission point selection in the downlink described in Embodiment 1, as a predetermined condition (hereinafter, referred to as a reporting condition) that is a reference for whether or not terminal 300 performs reporting of the reception power (RSRP) measured using the CSI-RS. For example, the set reporting condition is included in the CSI-RS candidate list and is indicated to terminal 300.

That is, in the CSI-RS candidate list, as the reporting condition of the RSRP (reception power) measured using the CSI-RS, two types of reporting conditions including a reporting condition for transmission point (TP) selection in the downlink and a reporting condition for reception point (RP) selection in the uplink are set. For example, as the downlink (DL) reporting condition, a case where the RSRP is higher than a predetermined value (transmission point adding condition: TP adding condition), a case where the RSRP is lower than a predetermined value (transmission point deleting condition: TP deleting condition), or the like is used. Further, as the uplink (UL) reporting condition, a case where the path loss is less than a predetermined value (reception point adding condition: RP adding condition), a case where the path loss is greater than a predetermined value (reception point deleting condition: RP deleting condition), or the like is used.

Further, control section 101 determines the reception point that is the reference of the path loss calculation (reception point that is the path loss reference) in the uplink transmission power control of terminal 300, using information relating to a CSI-RS (an identifier of a CSI-RS resource that satisfies the UL reporting condition and a reception power measurement result), included in a signal (received signal) from terminal 300 input through receiving section 103 or inter-base station IF 104. That is, control section 101 selects the reception point (RP) on the basis of the information on the RSRP (information on the CSI-RS that satisfies the UL reporting condition) reported from terminal 300. That is, control section 101 determines at least one specific CSI-RS used for the path loss calculation in terminal 300, among the plurality of CSI-RSs. Further, base station 100 indicates to terminal 300 information relating to a reception point (RP) that is a path loss reference of the uplink transmission power control, using the identifier (CSI-RS index) indicated in the CSI-RS candidate list.

Here, for example, the CSI-RS candidate list is indicated by RRC signaling which is performed at relatively long intervals, and the reception point information is indicated by MAC signaling which can be performed at relatively short intervals.

Further, control section 101 determines configuration information (configuration) such as data transmitted by terminal 300 in the uplink, a resource or the like of a reference signal for each terminal 300 according to the determined reception point, and indicates the result to each terminal 300 through transmitting section 102. Here, control section 101 performs a control to reduce interference between signals from a plurality of terminals 300 received at each transmission point. For example, control section 101 sets random seeds such that hopping patterns are the same among a plurality of terminals 300. Further, as the uplink configuration information (configuration), for example, information on frequency/sequence or the like, information on a virtual Cell id or the like may be used. Further, the uplink configuration information may include an offset value (P0 in Equation 1 or additionally set offset value) of the uplink transmission power set for each reception point for adjustment of the uplink transmission power.

Receiving section 103 receives uplink data (PUSCH), a control signal (PUCCH) or a reference signal (DMRS, SRS) transmitted from terminal 300.

[Configuration of Pico Base Station 200]

In pico base station 200, the following operation (operation relating to the uplink) is added, in addition to the operation (operation relating to the downlink) of Embodiment 1.

Inter-base station IF 201 transmits reception data (PUSCH) from terminal 300 input through receiving section 203 to macro base station 100.

Receiving section 203 receives an uplink signal such as data (PUSCH) or a reference signal (DMRS, SRS) from terminal 300 through an antenna.

[Configuration of Terminal 300]

In terminal 300, the following operation (operation relating to the uplink) is added, in addition to the operation (operation relating to the downlink) of Embodiment 1.

Receiving section 301 receives a signal that includes an uplink reporting condition or information on the uplink transmission power control (information on a reception point (CSI-RS) that is a path loss reference) from macro base station 100 or pico base station 200, and outputs the received signal to control section 302.

Control section 302 specifies a CSI-RS used for path loss measurement, on the basis of the information on the uplink transmission power control input through receiving section 301 (including information on the CSI-RS that is the path loss reference). Control section 302 instructs measuring section 303 on information indicating the specified CSI-RS.

Similar to in Embodiment 1, measuring section 303 measures reception power (for example, RSRP) for each of a plurality of CSI-RSs, using a plurality of CSI-RSs indicated in the CSI-RS candidate list. Further, measuring section 303 determines whether the measured reception power satisfies the uplink reporting condition or the downlink reporting condition. If the path loss is included as the uplink reporting condition (when the path loss is compared with a threshold), measuring section 303 calculates the path loss (for example, PL indicated in Equation 1) using the measured reception power (RSRP) and the information on the CSI-RS transmission power (information indicated by macro base station 100).

If the measured reception power (or path loss) satisfies the reporting condition, measuring section 303 outputs a CSI-RS (identifier of a resource of the CSI-RS) corresponding to the reception power and information relating to the CSI-RS including information indicating the reception power to transmitting section 304. Here, measuring section 303 causes information indicating whether the reception power satisfies any one of the uplink reporting condition and the downlink reporting condition to be also included in the information relating to the CSI-RS.

Further, measuring section 303 calculates the path loss for the uplink transmission power control using the specific CSI-RS indicated in the information (information on the CSI-RS that is the path loss reference) on the uplink transmission power control indicated by control section 302.

[Operation of Macro Base Station 100 and Terminal 300]

The operations of macro base station 100 and terminal 300 having the above-described configuration will be described.

Figure 17:
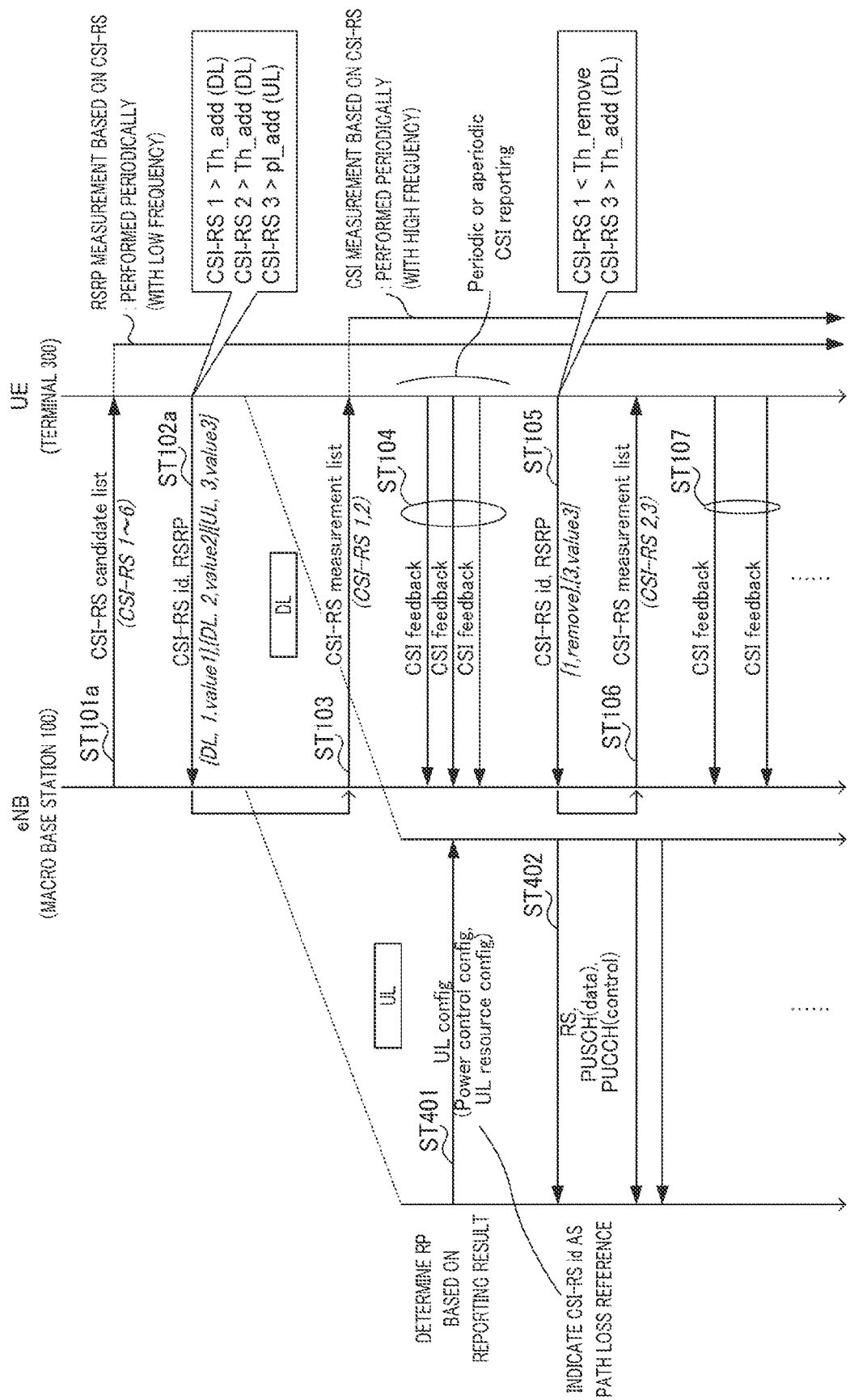
FIG. 17 is a diagram illustrating processes of a macro base station and a terminal according to Embodiment 5 of the invention.

FIG. 17 is a flowchart illustrating the flow of processes of macro base station 100 (indicated as eNB) and terminal 300 (indicated as UE). In FIG. 17, the same reference numerals are given to the same processes as in Embodiment 1 (FIG. 8), and repetitive description thereof will be omitted.

In ST101a, macro base station 100 indicates to terminal 300 a measuring method of reception power (for example, RSRP), and a "reporting condition (Event)" of a reception power measurement result (not shown). Here, macro base station 100 indicates to terminal 300 two types of reporting conditions including a reporting condition (DL reporting condition) for transmission point selection in the downlink and a reporting condition (UL reporting condition) for reception point selection in the uplink. For example, as the UL reporting condition, a case where the path loss is less than a predetermined value pl_add (UL) (reception point adding condition) or a case where the path loss is greater than a predetermined value pl_remove (UL) may be used.

Further, macro base station 100 includes CSI-RS transmission power information for uplink path loss calculation in the CSI-RS candidate list. The CSI-RS transmission power information represents transmission power of the CSI-RS at each reception point.

Measuring section 303 of terminal 300 performs RSRP measurement that uses the CSI-RS, on the basis of the CSI-RS candidate list indicated in ST101a and the measurement method of the reception power indicated by macro base station 100. That is, in FIG. 17, measuring section 303 measures RSRPs for six CSI-RSs (that is, six transmission points (reception points)), on the basis of CSI-RS configurations of CSI-RS 1 to CSI-RS 6 indicated in the CSI-RS candidate list. Further, measuring section 303 determines whether the measured RSRP satisfies the reporting condition. In FIG. 17, the RSRPs of CSI-RS 1 and CSI-RS 2 in the CSI-RS candidate list (CSI-RSs 1 to 6) are higher than a threshold Th_add (DL) of the DL reporting condition, and the RSRP of CSI-RS 3 is lower than a threshold pl_add (UL) of the UL reporting condition.

In ST102a, terminal 300 reports to macro base station 100 information indicating that the RSRP satisfies any one of the DL reporting condition and the UL reporting condition, in addition to the CSI-RS candidate number in which the reporting condition is satisfied and a measurement result of the CSI-RS in which the reporting condition is satisfied, among a plurality of CSI-RS candidates indicated in the CSI-RS candidate list. In FIG. 17, terminal 300 reports to macro base station 100 information ("DL" in FIG. 17) indicating that the DL reporting condition is satisfied, CSI-RS candidate numbers (CSI-RS 1 and CSI-RS 2 in FIG. 17) in which the DL reporting condition is satisfied, and measurement results (value 1 and value 2 in FIG. 17) of the CSI-RSs in which the DL reporting condition is satisfied. Similarly, in FIG. 17, terminal 300 reports to macro base station 100 information ("UL" in FIG. 17) indicating that the UL reporting condition is satisfied, a CSI-RS candidate number (CSI-RS 3 in FIG. 17) in which the UL reporting condition is satisfied, and a measurement result (value 3 in FIG. 17) of the CSI-RS in which the UL reporting condition is satisfied.

Macro base station 100 performs transmission point selection (processes for the DL) and reception point selection (processes for the UL) on the basis of the information received from terminal 300 in ST102a. Since the processes for the DL (ST103 to ST107 in FIG. 17) are the same as the processes of Embodiment 1, description thereof will be omitted.

Macro base station 100 selects or changes the reception point in the uplink of terminal 300, on the basis of the information relating to the uplink reported from terminal 300 in ST102a. In FIG. 17, control section 101 of macro base station 100 determines that the path loss for the reception point that uses CSI-RS 3 in terminal 300 is low compared with other reception points. Thus, control section 101 determines the reception point for terminal 300 as the reception point that uses CSI-RS 3.

In ST401, macro base station 100 indicates to terminal 300 configuration information (power control config) on transmission power control relating to the determined reception point and uplink resource configuration information (UL resource config). Here, macro base station 100 indicates an identifier of the CSI-RS (information indicated in the CSI-RS candidate list) as the configuration information on the transmission power control, for example, as the information on the CSI-RS for path loss calculation used in the uplink transmission power control in terminal 300. Further, macro base station 100 indicates, as the uplink resource configuration information, resource configuration information for PUSCH, an RS (DMRS or SRS) or PUCCH (information on frequency/sequence or the like, or ID information used as random seeds), or an offset value (P0 in Equation 1 or additionally set offset value) of an uplink transmission power set for each reception point for the uplink transmission power adjustment, for example.

In ST402, terminal 300 changes the configuration of the uplink transmission power control according to the configuration information indicated by macro base station 100 in ST401, and transmits an uplink signal such as PUSCH (data), an RS (DMRS, SRS) or PUCCH (control information) according to the changed configuration.

In this way, in macro base station 100, receiving section 103 receives information (third information) relating to at least one CSI-RS corresponding to the path loss (third reception quality) that satisfies an uplink reporting condition (predetermined condition) in a plurality of base stations, on the basis of the path loss (third reception quality) for each base station measured by terminal 300 using CSI-RSs from a plurality of base stations (transmission points or reception points), control section 101 determines a specific CSI-RS (that is, a CSI-RS of a base station that is a reception point of terminal 300) on the basis of the information relating to the CSI-RS corresponding to the path loss that satisfies the uplink reporting condition, and transmitting section 102 transmits information (UL config; fourth information) relating to the determined at least one specific CSI-RS. In terminal 300, measuring section 303 measures the path loss (third reception quality) for each base station (CSI-RS) using the CSI-RS from the plurality of base stations (transmission points or reception points) indicated in the CSI-RS candidate list indicated by macro base station 100, transmitting section 304 transmits the information (third information) relating to at least one CSI-RS corresponding to the path loss (third reception quality) that satisfies the uplink reporting condition (CSI-RS) among a plurality of CSI-RSs, and receiving section 301 receives information (UL config; fourth information) relating to at least one specific CSI-RS determined using the information relating to the CSI-RS corresponding to the path loss that satisfies the uplink reporting condition among a plurality of CSI-RSs.

In this way, in the present embodiment, the CSI-RS candidate list is also used for the reception point selection in the uplink, in addition to the transmission point selection in the downlink. That is, in the present embodiment, macro base station 100 and terminal 300 share the same CSI-RS candidate list in the transmission point selection in the downlink and the reception point selection in the uplink. Thus, it is possible to reduce the amount of information necessary for indication of reception point information.

Further, in the present embodiment, the information relating to the CSI-RS in which the uplink reporting condition is satisfied includes an identifier indicating the CSI-RS corresponding to the path loss that satisfies the uplink reporting condition or a measurement result of the path loss that satisfies the uplink reporting condition, similarly to the information relating to the CSI-RS in which the downlink reporting condition is satisfied as described in Embodiment 1. That is, the measurement result of reception quality (for example, the reception power or path loss that satisfies the reporting condition) is reported to macro base station 100 from terminal 300 in both the uplink and the downlink using a common format. Thus, it is possible to prevent increase in the number of signaling formats between terminal 300 and macro base station 100 and thus to build a simple system.

Further, in the present embodiment, macro base station 100 indicates terminal 300 the identifier of the CSI-RS (CSI-RS index) included in the CSI-RS candidate list that is indicated to terminal 300 in advance as information (for example, UL config) indicating the determined reception point. Further, on the basis of the identifier of the CSI-RS (CSI-RS index) indicated by macro base station 100, terminal 300 specifies the reception point, and also specifies configuration information on a CSI-RS corresponding to the reception point from the CSI-RS candidate list. Thus, compared with the case where the configuration information on the CSI-RS is indicated whenever the reception point is updated, it is possible to reduce overhead necessary for indication of reception point information.

Further, in the present embodiment, terminal 300 measures the RSRP in advance using the CSI-RS indicated in the CSI-RS candidate list. Thus, terminal 300 can obtain the RSRP obtained by performing sufficiently long averaging even immediately after the change of the reception point is indicated. Thus, according to the present embodiment, terminal 300 can perform transmission power control using highly precise path loss immediately after the change of the reception point is indicated.

In the present embodiment, the case where the path loss is used as the "UL reporting condition" has been described, but the "UL reporting condition" is not limited to the case where the path loss is used. For example, a case where "RSRP+$\Delta$" is equal to or higher (or lower) than a predetermined threshold may be used as the "UL reporting condition." Here, $\Delta$ is an offset value based on the transmission power difference between macro base station 100 and pico base station 200. For example, the transmission power of macro base station 100 is set to 43 dBm, and the transmission power of specific base station 200 is set to 30 dBm. In this case, $\Delta$ may be set to 13 dB (=43−30). This is because a signal transmitted in the uplink from terminal 300 in which the reception power of a signal from pico base station 200 is lower by 13 dB than the reception power of a signal from macro base station 100 is received at the same power in macro base station 100 and corresponding pico base station 200 (here, it is assumed that transmission attenuation characteristics of both base stations are the same). For this reason, the offset $\Delta$ is added to the reception power (RSRP) of pico base station 200 in the "UL reporting condition." Thus, terminal 300 can determine whether the "UL reporting condition" using the reception power (RSRP) is satisfied for the respective base stations (macro base station 100 and pico base station 200). Here, macro base station 100 indicates to terminal 300 the CSI-RS candidate list including the offset value ($\Delta$) for each reception point. Further, in the "UL reporting condition", a value obtained by subtracting the offset value ($\Delta$) from a transmission power value calculated using the path loss from macro base station 100 in the uplink transmission power control of terminal 300 may be set as a transmission power value of pico base station 200. In this way, in the present embodiment, the reception quality (third reception quality) used for the "UL reporting condition" may be the reception quality (path loss, RSRP+$\Delta$ and the like) calculated using the reception power (first reception quality. RSRP) measured from each transmission point.

Further, in the present embodiment, the case where the reception point selection is performed using the signal (CSI-RS) in the downlink has been described. However, in the present embodiment, macro base station 100 may select the reception point using a signal (for example, an SRS (sounding reference signal)) in the uplink. In this case, macro base station 100 indicates the selected reception point using a CSI-RS identifier in the CSI-RS candidate list, and thus, it is possible to avoid an increase in overhead for indication of reception point information, similarly to the present embodiment.

Further, in the present embodiment, the case where two types of reporting conditions including the reporting condition for the transmission point selection in the downlink and the reporting condition for the reception point selection in the uplink are set has been described. However, in the present embodiment, a plurality of reporting conditions having different uses may be set.

Further, in the present embodiment, when there are a plurality of antennas for each transmission point (reception point), the path loss (or RSRP+A) may be calculated using an average RSRP between the antennas, or may be calculated using the sum of RSRPs of the respective antennas.

Further, in the downlink, switching of transmission points is performed to transmit a signal from a transmission point positioned in the vicinity of terminal 300. On the other hand, in the uplink, an operation in which the reception is performed only in macro base station 100 (or in all base stations) without switching between reception points may be considered. Alternatively, an operation in which switching between reception points is performed only in the uplink may be considered. Thus, macro base station 100 may indicate information indicating that each transmission point/reception point (CSI-RS) corresponds to any one of a downlink RSRP reporting target, an uplink RSRP reporting target or an uplink-downlink RSRP reporting target to terminal 300. The information indicating the RSRP reporting condition may be explicitly indicated. For example, a CSI-RS in which transmission power information on each CSI-RS indicated in the CSI-RS candidate list is the maximum value may be regarded as a target other than the uplink RSRP reporting target. When the CSI-RS transmission power information is the maximum value, since the calculated path loss becomes a large value, the corresponding CSI-RS is not selected as the reception point, and may be thus regarded as the target other than the reporting target with no problems. Further, a CSI-RS in which the offset added to the RSRP (CSI-RS individual offset) is the minimum value may be regarded as a target other than the downlink RSRP reporting target. When the offset is the minimum value, the measurement result is equal to or larger than a threshold of the reporting condition (the reporting condition is not satisfied), and thus, the reception point is barely selected. Thus, the CSI-RS may be regarded as the target other than the reporting target with no problems. Further, an operation when the transmission power information is the "maximum value" or the offset is the "minimum value" may be explicitly set, or may be implicitly performed. Thus, it is possible to deal with each operation mode of CoMP only in the downlink, CoMP only in the uplink or CoMP in both the uplink and downlink. Further, as described above, the RSRP reporting target may not be set for each CSI-RS (that is, a transmission point/reception point), and the downlink RSRP reporting target, the uplink RSRP reporting target and the uplink-downlink RSRP reporting target may be indicated to each terminal (UE).

Hereinbefore, the embodiments of the present invention have been described.

[Other Embodiments]

(1) In each of the above-described embodiments, when one transmission point has a plurality of antenna ports, a terminal may report to a macro base station an average value (simple average, weighted average, median value or the like) of measurement results that use CSI-RSs transmitted from different antenna ports of each transmission point based on the CSI-RS candidate list. Since only one measurement result indicating the average value of the measurement results at the respective antenna ports is reported, the amount of information necessary for reporting is reduced. Further, by averaging the measurement results at the plurality of antenna ports provided in the transmission point, it is possible to improve the measurement accuracy of reception quality.

Further, even though one transmission point has a plurality of antenna ports, a terminal may report to a macro base station a measurement result that uses a CSI-RS transmitted from one antenna port or an average value of measurement results that use CSI-RSs transmitted from a limited number of antenna ports. In this case, it is possible to limit necessary resources for measurement to the minimum, and thus, it is possible to reduce the processing burden in the terminal.

(2) In each of the above-described embodiments, the reception quality measured using a CSI-RS by a terminal is not limited to reception power, and for example, RSRP, RSRQ, SINR, SLNR or the like may be used.

(3) In each of the above-described embodiments, as the reporting condition of the result of reception power measurement that uses the CSI-RS, the cases are described, where the measurement result is higher than threshold A (or Th_add), where the measurement result is lower than the threshold B (or Th_remove), and where the measurement result is higher by C [dB] than the measurement result of the CSI-RS currently designated as the CSI-RS measurement target. However, the reporting condition of the result of reception power measurement that uses the CSI-RS is not limited to these cases. For example, a reporting condition (Event) of measurement for mobility control (for example, see "3GPP TS36.331 v10.1.0") may be used. By reusing the existing condition (the event or the like) as the reporting condition of the result of reception power measurement that uses the CSI-RS, it is possible to achieve simplification of a terminal, and to reduce the man-hours for testing. Further, the reporting condition of the result of reception power measurement that uses the CSI-RS may be set in consideration of factors other than a radio wave environment, such as a channel state. For example, a condition that more transmission points are used for a terminal of a user who pays a higher fee may be set as the reporting condition.

(4) In each of the above-described embodiments, the case where the CSI-RS is transmitted in the different resource for each transmission point in the macro cell has been described. However, the CSI-RS is not necessarily transmitted in a different resource for each transmission point in the macro cell. For example, a CSI-RS may be transmitted from each transmission point in a different resource in a range (area) where a signal reaches a certain terminal. That is, CSI-RSs may be transmitted from different transmission points in the same resource in a place distant enough or in a place separated by a wall.

(5) In each of the above-described embodiments, configurations of CSI-RSs used by transmission points in a cell of a different cell ID may be included in the CSI-RS candidate list. In this case, information on the cell ID may be included in each CSI-RS configuration in the CSI-RS candidate list. Thus, a terminal can select a transmission point having a large reception power from among cells having different IDs.

(6) In each of the above-described embodiments, one CSI-RS configuration may be set for a plurality of transmission points. For example, one CSI-RS configuration may be set as CSI-RSs of four-antenna ports that is the sum of two antenna ports provided in transmission point 1 and two antenna ports provided in transmission point 2. In this case, since one CSI measurement result for the CSI-RSs of four antenna ports is reported, the amount of information for the reporting information is reduced.

(7) In each of the above-described embodiments, the case where the CSI-RS is used has been described, but a signal or a channel that can be transmitted in a different resource from each transmission point may be used, instead of the CSI-RS. For example, a primary synchronization signal and a secondary synchronization signal (PSS/SSS) that is a synchronization signal may be used, instead of the CSI-RS. In this case, configuration information (scrambling series or the like) on the PSS/SSS instead of the CSI-RS candidate list is indicated to a terminal by a macro base station.

(8) In each of the above-described embodiments, the case where the CRS is transmitted from all transmission points has been described, but the CRS may be transmitted from only the macro base station (HPN), for example.

(9) In each of the above-described embodiments, the example in which the network is configured by the macro base station and the pico base station has been described. However, even in a network configured by only macro base station, the present invention may be applied to the network when a plurality of macro base stations use the same cell ID. Further, the pico base station may be configured by only a radio amplifying section and an antenna, as in a remote radio head (RRH) or the like, or may be provided with a baseband processing section, as in a normal base station.

(10) In each of the above-described embodiments, a description has been provided for the case where the result of reception power measurement that uses the CSI-RS satisfies the reporting condition, and the case where the terminal reports only the measurement result in which the reporting condition is satisfied to the macro base station. However, in a case where the result of reception power measurement that uses the CSI-RS satisfies the reporting condition, the terminal may report measurement results of all the CSI-RSs to the macro base station. In this case, the macro base station may determine the CSI-RS (transmission point) that is the CSI measurement target from all the reported CSI-RSs.

(11) The zeroTxPowerCSI-RS, resourceConfig and the like used in each of the above-described embodiments may use parameters disclosed in 3GPP TS36.331 v10.1.0, for example.

(12) In each of the above-described embodiments, it is possible to include information indicating the CSI-RS candidate list of each cell or carrier in a measurement target for measurement using CRSs in Rel. 8 to Rel. 10 to indicate the CSI-RS candidate list to the terminal. Thus, reusing the existing signaling makes it possible to build a simple system.

(13) In each of the above-described embodiments, as described in (3), as the reporting condition of the result of reception power measurement that uses the CSI-RS, the cases are described, where the measurement result is higher than threshold A (or Th_add), where the measurement result is lower than the threshold B (or Th_remove), and where the measurement result is higher by C [dB] than the measurement result of the CSI-RS currently designated as the CSI-RS measurement target, for example. Here, the second reporting condition of "the case where the measurement result is lower than the threshold B (or Th_remove)" may be divided into two reporting conditions.

The first reporting condition corresponds to a method of reporting the first reception quality when the measurement result that uses the CSI-RS set in the CCL is lower than the threshold B.

The second reporting condition corresponds to a method of reporting the first reception quality when the measurement result of the CSI-RS included in the first reception quality that is already reported to the base station is lower than the threshold B, for example, as in "the case where the measurement result is higher than threshold A (or Th_add)" that is the first reporting condition. In this way, as the first reception quality is reported to the base station only when the measurement result of any one of the CSI-RS candidates that is set or is to be set as the CML included in the second information is lower than the threshold B, it is possible to reduce the frequency of reporting. A CSI-RS in which the terminal reports that the measurement result is lower than a specific threshold may be excluded from the list of CSI-RSs that are targets of the second reporting condition. In this way, it is possible to avoid re-transmission of the reception quality of the CSI-RS in which the base station grasps that the measurement result is lower than the specific threshold, and to reduce the frequency of reporting. The specific threshold may be the value of threshold A, may be the value of the threshold B, or may be a separately set value.

Further, the following five methods are possible as the reporting method of the first reception quality when the reporting condition is satisfied.

In the first reporting method, when the reporting condition is satisfied, a terminal reports measurement results of all CSI-RSs in a CSI-RS candidate list. Thus, since the latest CSI-RS measurement result is obtained for all the CSI-RSs in the candidate list in a base station, it is possible to set a more appropriate CML.

In the second reporting method, when the reporting condition is satisfied, a terminal reports only a measurement result of a CSI-RS that is higher than a specific threshold to a base station as the first reception quality. Thus, since the reported CSI-RS measurement result is limited, it is possible to reduce the size of a reporting message. The specific threshold may be the value of threshold A or the value of threshold B, or may be separately set.

In the third reporting method, when the reporting condition is satisfied, a terminal reports only the measurement result of a CSI-RS that is higher than a specific threshold among the measurement results of the CSI-RSs included in the first reception quality reported in the first reporting condition of "the case where the measurement result is higher than threshold A (or Th_add)" to a base station as the first reception quality. The specific threshold may be the value of threshold A or the value of threshold B, or may be separately set. Thus, the base station can determine which CSI-RS is suitable as a candidate of a CML, and can reduce the size of a reporting message of the measurement result of the CSI-RS.

In the fourth reporting method, when the reporting condition is satisfied, a terminal reports all the measurement results of the CSI-RSs included in the first reception quality reported in the first reception report of "the case where the measurement result is higher than threshold A (or Th_add). Thus, it is possible to update a measurement result of each CSI-RS that is already retained by a base station.

The fifth reporting method corresponds to a method in which a terminal reports only a measurement result of a CSI-RS that satisfies the reporting condition, when the reporting condition is satisfied. Thus, it is possible to minimize the size of a reporting message.

(14) In each of the above-described embodiments, the CRS is set in units of cells, and users in the cell use the common CRS. On the other hand, a CSI-RS may be set to be specific to a cell or a transmission point (TP). That is, all users in the cell may use the common CSI-RS setting and the user specific setting. In the case of user specific setting, the CSI-RS may be set to an individual user, and the received CSI-RS may be different for each user. For example, the CSI-RS may be transmitted in the same resource from a plurality of TPs to a user who uses a CoMP transmission method in which the coordinated transmission is performed from the plurality of TPs. In this case, the user who uses the CoMP transmission method uses the CSI-RS transmitted in the same resource from the plurality of TPs, while other users use the CSI-RS transmitted from one TP. Further, for example, a CSI-RS at a crowded TP may not be set for limited users, and thus, it is possible to avoid throughput degradation of users connected to the TP. In this way, setting the CSI-RS to be specific to the user makes it possible to achieve a flexible system in which users use various transmission methods.

(15) In each of the above-described embodiments, the reception power measurement result is reported to the macro base station, but the result may be reported through a different node such as an LPN or pico base station. In this case, a terminal merely transmits reporting data to the different node such as an LPN or pico base station.

(16) In each of the above-described embodiments, the macro base station and the pico base station may each use one different carrier frequency, or may use different carrier frequencies in combination. For example, the macro base station may use a carrier frequency of f1, and the pico base station may use a carrier frequency of f2. Further, the macro base station may use two carrier frequencies of f1 and f2, and the pico base station may use one carrier frequency of f2. In this case, the result of reporting of the reception power measurement that uses the CRS as described in Embodiment 3 and the handover based on the reporting (or movement management) may be performed at f1 (that is, between macro base stations), and the reporting of the result of reception power measurement that uses the CSI-RS and the handover based on the reporting (or movement management) may be performed at f2 (that is, between pico base stations). In this case, since appropriate reception power measurement results are obtained at different frequencies, it is possible to connect a terminal to a cell having higher reception quality. Further, as in embodiment 4, the terminal may perform communication using both f1 and f2 as carrier aggregation. In this case, the terminal can perform communication while being connected to a base station (or cell) having good reception quality at f1 and f2, to thereby achieve high throughput.

(17) In each of the above-described embodiments, the extension carrier may be referred to as a new carrier type or an additional carrier type. Further, the extension carrier may be defined as a carrier through which no PBCH or PDCCH is transmitted.

(18) In each of the embodiments, a description has been provided with antennas, but the present invention can be applied to antenna ports in the same manner.

The term "antenna port" refers to a logical antenna including one or more physical antennas. In other words, the term "antenna port" does not necessarily refer to a single physical antenna, and may sometimes refer to an array antenna including a plurality of antennas and/or the like.

For example, how many physical antennas are included in the antenna port is not defined in LTE, but the antenna port is defined as the minimum unit allowing the base station to transmit different reference signals in 3GPP LTE.

In addition, an antenna port may be specified as a minimum unit to be multiplied by a precoding vector weighting.

(19) In the foregoing embodiments, the present invention is configured with hardware by way of example, but the invention may also be provided by software in concert with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosures of the specifications, the drawings, and the abstracts included in Japanese Patent Application No. 2011-171710, filed on Aug. 5, 2011 and Japanese Patent Application No. 2011-217298, filed on Sep. 30, 2011, are incorporated herein by reference in their entirety.

INDUSTRIAL APPLICABILITY

The present invention is useful in that it is possible to select an appropriate transmission point while reducing overhead for CSI reporting.

REFERENCE SIGNS LIST

100 Macro base station
101, 302 Control section
102, 202, 304 Transmitting section
103, 203, 301 Receiving section
104, 201 Inter-base station IF
200 Pico base station
300 Terminal
303 Measuring section

The invention claimed is:
1. A terminal comprising integrated circuits configured to:
    measure, using a plurality of channel state information reference signals (CSI-RSs) from a plurality of first transmission points of a first cell of a first macro base station and having a first cell identifier of the first macro base station, a reception power for each of the plurality of CSI-RSs, the plurality of CSI-RSs being indicated in a candidate list transmitted from the first macro base station;
    report the reception power for first CSI-RSs corresponding to the reception power that satisfies a first reporting condition along with an identification of the first CSI-RSs;

receive first information specifying at least one CSI-RS selected by the first macro base station among the first CSI-RSs for which the report has been transmitted;

measure channel state information (CSI) for the at least one specified CSI-RS;

report the CSI for the specified at least one CSI-RS to the first macro base station;

wherein for a handover to a second cell of a second macro base station with a plurality of second transmission points using a second cell identifier of the second macro base station, the second cell identifier is different from the first cell identifier;

the reception power for a cell specific reference signal (CRS) is measured from one of the plurality of second transmission points;

when the reception power for the CRS satisfies a second reporting condition, the reception power for each of the plurality of CSI-RSs is measured from the plurality of second transmission points for transmission in a handover completion message;

the reception power for the CRS satisfying the second reporting condition is reported along with an identification of the second cell corresponding to the reception power satisfying the second reporting condition;

an instruction for the handover and second information necessary for the handover is received after the report of the reception power for the CRS along with the identification of the second cell; and the handover completion message is transmitted including the reception power for the each of the plurality of CSI-RSs from the plurality of second transmission points.

2. The terminal according to claim 1, wherein the CSI is reported when a report request for the reception power for the at least one specified CSI-RS is received.

3. The terminal according to claim 1, wherein the candidate list indicates configuration information on the plurality of CSI-RSs.

4. The terminal according to claim 1, wherein the reception power for the plurality of CSI-RSs is measured in a resource group that is set at a timing of a predetermined period, and no data signal is assigned in the resource group.

5. The terminal according to claim 4, wherein the plurality of CSI-RSs are assigned to mutually different resources in the resource group.

6. The terminal according to claim 4, wherein a transmission period of the plurality of CSI-RSs is an integer multiple of the predetermined period.

7. The terminal according to claim 1, wherein:
the terminal performs communication using a plurality of component carriers;
when a specific component carrier is newly added to the terminal, the reception power is measured using the plurality of CSI-RSs from the plurality of first transmission points in a frequency of the specific component carrier;
the reception power for at least one CSI-RS satisfying a predetermined condition is reported to the first macro base station; and
the at least one CSI-RS is mapped in the specific component carrier, and the CRS is not mapped in the specific component carrier.

8. The terminal according to claim 1, wherein:
the reception power for second CSI-RSs satisfying a third reporting condition relating to uplink is reported along with an identification of the second CSI-RSs corresponding to the reception power satisfying the third reporting condition; and
a third information specifying at least one CSI-RS selected by the first macro base station is received among the second CSI-RSs for which the report has been transmitted.

9. The terminal according to claim 1, wherein an amount of information used for indicating the reception power is smaller than the amount of information used for indicating the CSI.

10. The terminal according to claim 1, wherein a measurement period of the reception power is longer than a measurement period of the CSI.

11. A reception quality reporting method comprising:
measuring, using a plurality of channel state information reference signals (CSI-RSs) from a plurality of first transmission points of a first cell of a first macro base station and having a first cell identifier of the first macro base station, a reception power for each of the plurality of CSI-RSs, the plurality of CSI-RSs being indicated in a candidate list transmitted from the first macro base station;
reporting the reception power for first CSI-RSs corresponding to the reception power that satisfies a first reporting condition along with an identification of the first CSI-RSs;
receiving first information specifying at least one CSI-RS selected by the first macro base station among the first CSI-RSs for which the report has been transmitted;
measuring channel state information (CSI) for the at least one specified CSI-RS;
reporting the CSI for the specified at least one CSI-RS to the first macro base station;
wherein for a handover to a second cell of a second macro base station with a plurality of second transmission points using a second cell identifier of the second macro base station, the second cell identifier is different from the first cell identifier;
measuring the reception power for a cell specific reference signal (CRS) from one of the plurality of second transmission points;
measuring, when the reception power for the CRS satisfies a second reporting condition, the reception power for each of the plurality of CSI-RSs from the plurality of second transmission points for transmission in a handover completion message;
reporting the reception power for the CRS satisfying the second reporting condition along with an identification of the second cell corresponding to the reception power satisfying the second reporting condition;
receiving an instruction for the handover and second information necessary for the handover after the report of the reception power for the CRS along with the identification of the second cell; and
transmitting the handover completion message including the reception power for the each of the plurality of CSI-RSs from the plurality of second transmission points.

* * * * *